United States Patent
Du et al.

(10) Patent No.: US 7,818,443 B2
(45) Date of Patent: *Oct. 19, 2010

(54) LOW POWER DIGITAL AUDIO DECODING/PLAYING SYSTEM FOR COMPUTING DEVICES

(75) Inventors: Sterling Du, Palo Alto, CA (US); James Lam, Pleasanton, CA (US); Eva Sheng, Shanghai (CN)

(73) Assignee: O2Micro International Ltd., Georgetown (KY)

( * ) Notice: Subject to any disclaimer, the term of this patent is extended or adjusted under 35 U.S.C. 154(b) by 1022 days.

This patent is subject to a terminal disclaimer.

(21) Appl. No.: 11/373,695

(22) Filed: Mar. 10, 2006

(65) Prior Publication Data
US 2006/0259642 A1 Nov. 16, 2006

Related U.S. Application Data

(63) Continuation-in-part of application No. 10/406,949, filed on Apr. 3, 2003, now abandoned, which is a continuation-in-part of application No. 10/272,740, filed on Oct. 17, 2002, now Pat. No. 7,522,966, which is a continuation-in-part of application No. 10/208,728, filed on Jul. 30, 2002, now Pat. No. 7,522,965, which is a continuation-in-part of application No. 09/969,060, filed on Oct. 2, 2001, now Pat. No. 7,522,964, which is a continuation-in-part of application No. 09/921,171, filed on Aug. 2, 2001, now Pat. No. 7,526,349.

(60) Provisional application No. 60/698,298, filed on Jul. 11, 2005, provisional application No. 60/250,899, filed on Dec. 1, 2000, provisional application No. 60/265,466, filed on Jan. 30, 2001.

(51) Int. Cl.
*G06F 15/16* (2006.01)
*G11B 19/00* (2006.01)
*G06F 11/00* (2006.01)
*G06F 17/00* (2006.01)

(52) U.S. Cl. .......................... 709/231; 709/247; 714/1; 714/14; 700/94; 369/24.01

(58) Field of Classification Search ................ 709/247, 709/231, 218, 216; 710/1, 14; 700/94; 369/24.01
See application file for complete search history.

(56) References Cited

U.S. PATENT DOCUMENTS 6,006,285 A 12/1999 Jacobs et al.

(Continued)

FOREIGN PATENT DOCUMENTS

EP 0982732 A1 3/2000

(Continued)

OTHER PUBLICATIONS

English language abstract of JP H08-111082 (1 Page).
English translation of Official Inquiry received in Japan Application No. 2002-546339 dated Feb. 24, 2009 (7 pages).

(Continued)

Primary Examiner—Wing F Chan
Assistant Examiner—Nam Thai
(74) Attorney, Agent, or Firm—Wang Law Firm; Li K. Wang

(57) ABSTRACT

The present invention is a computer system adapted to play audio files. The computer system includes a central processing unit, a storage unit, a first operating system, an interfacing unit, and a second operating system. The first operating system can control at least the CPU. The interface unit can interface with an external digital media device that may store a plurality of compressed audio files. The second operating system is capable of controlling the computer system operating in an audio playback mode. The power of the computer system is turned on and the computer system plays the plurality of compressed audio files in the audio playback mode when the external digital media device is in communication with the interface unit.

18 Claims, 16 Drawing Sheets

U.S. PATENT DOCUMENTS

| | | |
|---|---|---|
| 6,006,337 A | 12/1999 | Koo |
| 6,038,672 A | 3/2000 | Klein |
| 6,061,306 A * | 5/2000 | Buchheim ................ 369/2 |
| 6,226,237 B1 * | 5/2001 | Chan et al. ................ 710/14 |
| 6,266,714 B1 | 7/2001 | Jacobs et al. |
| 6,763,458 B1 * | 7/2004 | Watanabe et al. ......... 713/100 |
| 2002/0093886 A1 | 7/2002 | Ijichi et al. |

FOREIGN PATENT DOCUMENTS

| | | |
|---|---|---|
| EP | 1028425 A2 | 8/2000 |
| JP | H08-111082 | 4/1996 |
| JP | 09101848 A1 | 4/1997 |
| JP | 10-283195 | 10/1998 |
| JP | 2000251486 | 9/2000 |
| WO | WO 01/61442 A1 | 8/2001 |
| WO | WO 02/45319 A2 | 6/2002 |

OTHER PUBLICATIONS

Anonymous, "OZ163 AudioDJ," O2Micro—News—Archives, Internet Citation, Apr. 6, 1998, p. 1, XP007912279, www.o2micro.com/news/pr_980406_2_.html.

Anonymous, "OZ165 Next Generation AudioDJ," O2Micro—News—Archives, Internet Citation, Oct. 28, 1999, p. 1, XP007912280, www.o2micro.com/news/pr_991028.html.

Bostroem Tomas et al., "Mobile Audio Distribution," Persoanl And Ubiquitous Computing, Springer Verlag, London, GB, vol. 3, No. 4, Dec. 1, 1999, pp. 166-172, XPO00712339.

Supplementary EPO Search Report, Mar. 31, 2010.

* cited by examiner

LOW POWER DIGITAL AUDIO DECODING/PLAYING SYSTEM FOR COMPUTING DEVICES

RELATED APPLICATION

This application claims the benefit of U.S. provisional application Ser. No. 60/698,298, filed on Jul. 11, 2005, all the teachings of which are incorporated herein by reference, and this application is a continuation-in-part application of U.S. nonprovisional application Ser. No. 10/406,949, filed on Apr. 3, 2003, now abandoned which is a continuation-in-part application of U.S. nonprovisional application Ser. No. 10/272,740, filed on Oct. 17, 2002, now U.S. Pat. No. 7,522,966 which is a continuation-in-part application of U.S. nonprovisional application Ser. No. 10/208,728, filed on Jul. 30, 2002, now U.S. Pat No. 7,522,965 which is a continuation-in-part application of U.S. nonprovisional application Ser. No. 09/969,060, filed on Oct. 2, 2001, now U,S, Pat. No. 7,522,964 which is a continuation-in-part application of U.S. nonprovisional application Ser. No. 09/921,171, filed on Aug. 2, 2001, now U.S. Pat No. 7,526,349 all the teachings of which are incorporated herein by reference, which claims the benefit of U.S. provisional application Ser. No. 60/250,899, filed on Dec. 1, 2000 and U.S. provisional application Ser. No. 60/265,466, filed on Jan. 30, 2001, all the teachings of which are incorporated herein by reference.

BACKGROUND OF THE INVENTION

1. Field of the Invention

The present invention relates generally to portable computing devices for reproducing audio and video recordings, and more particularly, to portable computing devices with multiple operating systems and capable of interfacing external media devices.

2. Description of the Related Art

Presently there exist various portable devices for replaying digital audio recordings that have been compressed in accordance with one or more compressed audio digital recording formats, e.g., MPEG (Moving Picture Experts Group), Audio Layer-3 (MP3), Window® Media Audio (WMA), and Advanced Audio Coding (MC). To date, the most popular format has been MP3, a compression scheme that results in about 10:1 compression of the size of digital music files. The devices can be divided into two classes, those which store the compressed digital audio recordings in an electronic solid-state memory, and those which record the compressed digital audio for subsequent reproduction using an electromechanical device such as a compact disk ("CD") player or on a hard disk drive of a digital computer.

For example, portable devices for playing MP3 compressed digital audio recordings that use electronic solid-state memory, e.g., flash-memory, are capable of storing about ten (10) music selections. With an add-in memory card, such devices can carry a total of about twenty (20) music selections. These MP3 players that store the MP3 compressed digital audio recordings in an electronic solid-state memory consume comparatively little electrical power. Thus, such MP3 players provide an extended playing interval without having to power the computer's CD-ROM or hard disk drive.

U.S. Pat. No. 6,226,237, entitled "Low Power CD-ROM Player for Portable Computers," issued on May 1, 2001 (the "'237" patent), which is hereby incorporated by reference in its entirety, describes how a conventional notebook computer, when simply playing a conventional music DC, consumes an unnecessary large amount of electrical energy. That is largely due to the large number of the background functions that are unrelated to the playing of music that the Operating System (e.g., Windows®) is performing whenever the computer is turned on. That excessive electrical energy consumption for functions unrelated to the function the user is performing at the moment, i.e., playing music, quickly drains the power of the battery of a notebook computer that could more prudently be applied at another time in performance of microprocessor intensive tasks such as word processing and spreadsheet analysis. The solution presented in the '237 patent is a state machine that operates when main power to the portable devices is OFF. The invention of the '237 patent couples a CD-ROM to the audio subsystem (when main power is OFF) so that CDs can be played, without excessive battery drain, or without having to boot up the portable computer.

The prior art also includes silicon solutions that are dedicated function integrated circuits (ICs) or incorporated into application-specific integrated circuits (ASICs). These are usually expensive solutions as the digital signal processor (DSP) required in a dedicated chip results in a large, costly integrated circuit. One of the results is the use of a larger amount of PCB (printed circuit board) space.

Further, the 15 to 20 MIPS (million instructions per second) decode engine known in the art must be continuously running to generate the audio stream for the CODEC. Additionally, the dedicated decode engine needs to have the high-power-consuming hard disk drive (HDD) continuously operating. These approaches are limited to functioning only with MP3 compression, thereby eliminating the opportunity to adapt the system to newly emerging music compression algorithms, such as Microsoft's WMA or the music industry's proposed Secure Digital Music Initiative (SDMI) for secure audio.

Dedicated silicon solutions known in the art employ a DSP that must constantly be decoding the compressed audio files from a hard disk drive, which must therefore be constantly reading the audio files. Such known methods require much power, resulting in a fast battery discharge, (e.g., much faster that the possible 4 to 10 hours of desired use on a transoceanic flight).

Thus, known hardware MP3 decoder and players requiring an IC implementation and a hard disk drive being accessed non-stop are high in power consumption, difficult to upgrade, and expensive.

The present invention provides a solution that is low in power consumption, can be upgraded in the field for various music compression formats, is expected to cost no more than half the cost of the currently available hardware implementation, and may be made capable of playing up to hundreds of musical selections, while only having to access the HDD or CD-ROM less than 0.5% of the time.

SUMMARY OF THE INVENTION

In one embodiment, the invention is a computer system adapted to play audio files. The computer system includes a central processing unit (CPU), a storage unit, a first operating system, an interface unit, and a second operating system. The first operating system is adapted to control at least the CPU. The interface unit is adapted to interface with an external digital media device capable of storing a plurality of compressed audio files. The second operating system is capable of transmitting the plurality of compressed audio files from the external digital media device into the storage unit. The second operating system is capable of controlling the computer system operating in an audio playback mode. The computer system is turned on and the computer system plays the plurality of compressed audio files in the audio playback mode when the external digital media device is in communication with the interface unit.

In yet another embodiment, the invention is a computer system adapted to play audio files. The computer system includes a central processing unit (CPU), an interface unit, a speaker unit, a CODEC, and a filter and isolation circuit in communication with the CODEC. The interface unit is adapted to interface with an external digital media device. The CODEC is adapted to communicate with the speaker unit. The filter and isolation circuit is capable of receiving analog audio signals from the external digital media device when the external digital media device is in communication with the interface unit, and preventing the analog audio signals from flowing into the CODEC. The speaker unit outputs an audio according to the analog audio signals received by the filter and isolation circuit without the CPU being powered on when the computer system operates in an audio playback mode.

In yet another embodiment, the invention is a computer system adapted to play audio files. The computer system includes a central processing unit (CPU), a storage unit, a first operating system, an interface unit, a switch, and a second operating system. The first operating system is adapted to control at least the CPU. The interface unit is adapted to interface with an external digital media device capable of storing a plurality of compressed audio files. The switch is adapted to determine whether the external digital media device interfaces with the interface unit. The second operating system is capable of transmitting the plurality of compressed audio files from the external digital media device into the storage unit. The second operating system is capable of controlling the computer system operating in an audio playback mode. The computer system is turned on and plays the plurality of compressed audio files in the audio playback mode when the external digital media device is in communication with the interface unit.

In yet another embodiment, the invention is a computer system adapted to play audio files. The computer system includes a central processing unit (CPU), an interface unit, a switch, a speaker unit, a CODEC, and a filter and isolation circuit. The interface unit is adapted to interface with an external digital media device. The switch is adapted to determine whether the external digital media device interfaces with the interface unit. The CODEC is adapted to communicate with the speaker unit. The filter and isolation circuit is in communication with the CODEC. The filter and isolation circuit is capable of receiving analog audio signals from the external digital media device when the external digital media device is in communication with the interface unit, and preventing the analog audio signals from flowing into the CODEC. The speaker unit is capable of outputting an audio according to the analog audio signals received by the filter and isolation circuit without the CPU being powered on when the computer system operates in an audio playback mode.

In yet another embodiment, the invention is a method for playing a plurality of compressed audio files stored in a digital media device by a computer system. The method includes the steps for detecting the digital media device being in communication with an interface unit in the computer system, loading a first operating system onto the computer system, loading a second operating system onto the computer system, reading the plurality of compressed audio files from the digital media device into a storage unit in the computer system, decoding the plurality of compressed audio files, and playing the plurality of the decoded audio files in an audio playback mode. The first operating system controls the computer system and the first operating system is off. The second operating system is operating in the audio playback mode.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 3:
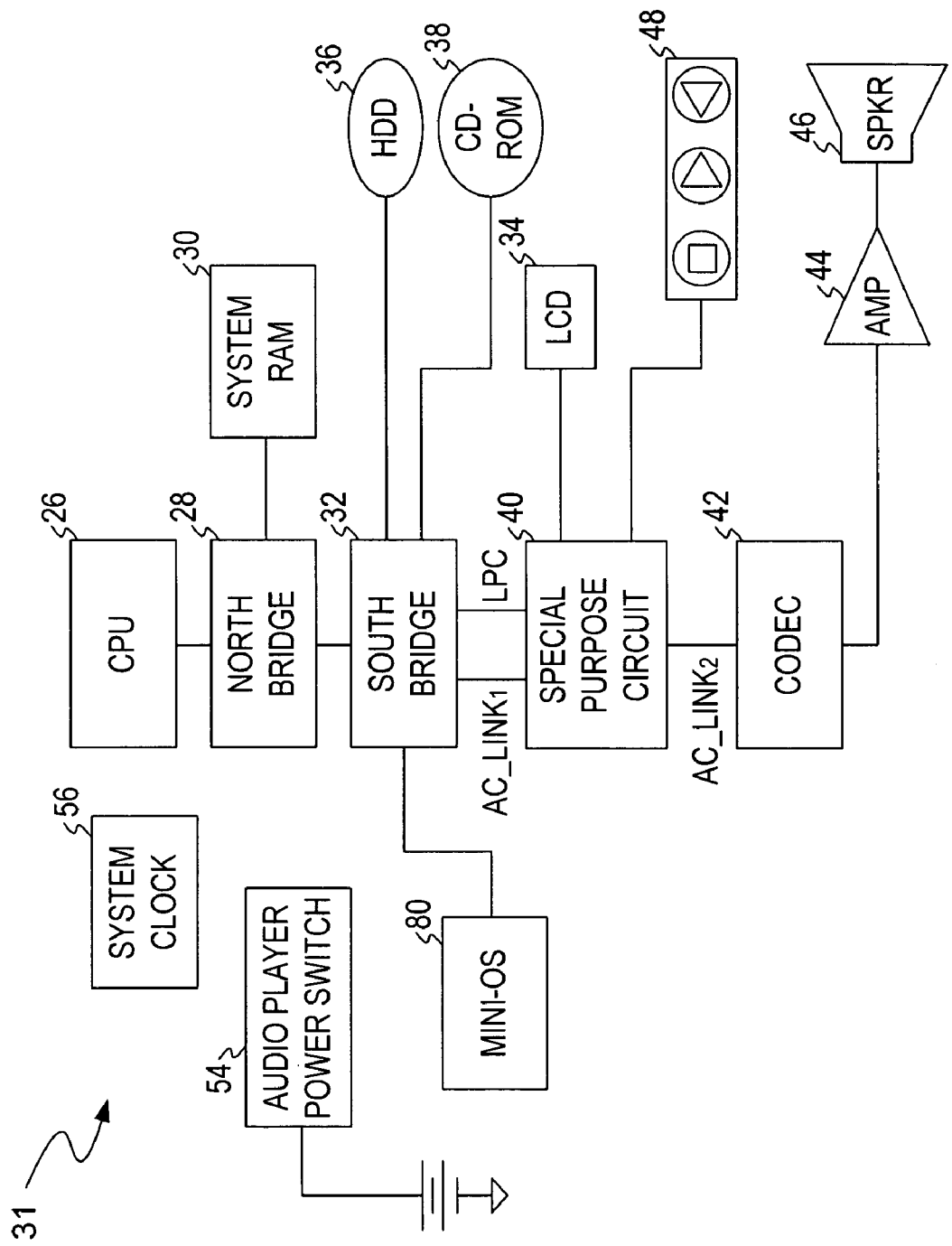
FIG. 3 is a block diagram of an exemplary audio player system consistent with one embodiment of the present invention.

In one embodiment, a computer system consistent with the invention includes a mini-OS (operating system) software and a hardware interface (a special purpose circuit (see element 40 in FIG. 3)) between a South Bridge and a CODEC, as illustrated in FIG. 3, to play the musical selections (or other stored audio) desired by the user. In another embodiment, no hardware is needed as the computer system employs a software only solution.

The mini-OS software of the present invention performs only those functions and enables those elements of the portable computer that are needed, when they are needed, to play the selected music, without performing all of the background functions performed by a full operating system, e.g., Windows®, and without accessing the monitor circuitry and monitor screen of the portable computer. Additionally, the mini-OS of the present invention only accesses a HDD (hard disk drive) (see element 36 in FIG. 3) when compressed files are being transferred to RAM. Thus, it will be seen that the mini-OS software portion of the present invention performs both the power saving and file management functions when playing audio.

Figure 1:
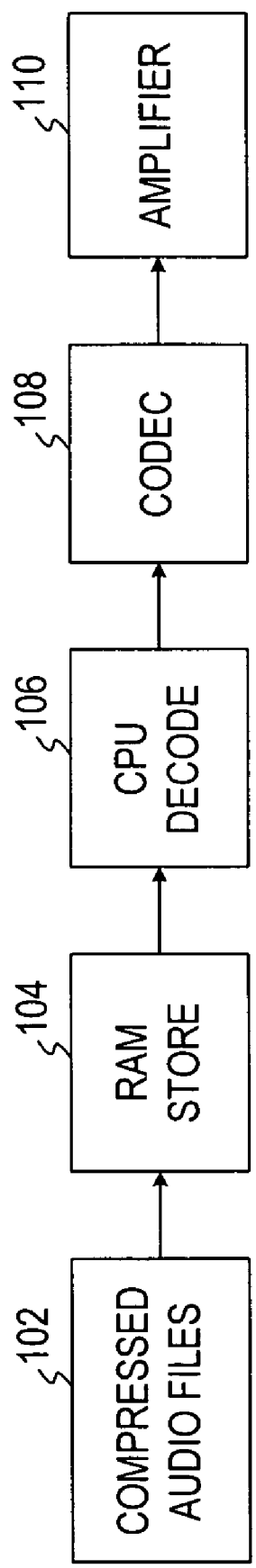
FIG. 1 is a block diagram representation an exemplary operational flow of one embodiment of the present invention.

FIG. 1 is a block diagram representation of the operational flow of the exemplary software compressed audio player in one embodiment of the present invention. The operational concept illustrated in FIG. 1 is as follows:

$1^{st}$ step: A browser, running on a full operating system, e.g., Windows®, of a portable computer is initially used to download compressed music files (for example 1000 songs) onto the PC hard disk drive (HDD) 102 (e.g., using 4 gigabyte of HDD space) at some time prior to the time at which the user desires to use the portable computer as an audio player and a play list is created, comprising the songs the user desires to hear at a later time;

$2^{nd}$ step: When the user desires to use the portable computer as an audio player, once the desired music files are on the HDD, the user operates an audio player on-switch to turn the portable computer fully on, boot up the entire computer, load in the mini-OS of the present invention instead of the usual Microsoft Windows® OS (the full operating system is not opened) with the power saving initialization subroutines and initializes only those portions of the portable computer as necessary, and the file management subroutines initialize the song play list or book generated in step 1, of a substantial number of songs, for desired music listening under direction of the user;

$3^{rd}$ step: The mini-OS software is then copied from the HDD 102 to RAM 104, and then the first set of compressed files from the song play list is copied from the HDD 102 to the system RAM 104 also using the mini-OS software of the present invention. For example, in today's PCs 128 Mbytes is a typical system RAM size, with the mini-OS software of the present invention taking about 8 Mbytes of the RAM, leaving approximately 120 Mbytes for use as a compressed music memory (i.e., a cache or buffer, using a system memory, dedicated memory, or other memory). That 120 Mbytes represents about 2 hours of continuous compressed music with a compression ration of 10:1, typical of MP3 files. Similarly, in the case when flash media is used for MP3 storage, all or most of the contents of the flash media card can be copied to the system RAM 104, thus minimizing the access of the flash media reader and allowing for a more responsive control over the MP3 files;

$4^{th}$ step: The file management software of the present invention sequentially delivers portions of the first music file to the CPU 106 where a decoding algorithm decompresses each file using the file management software of the present invention stored in the RAM 104. Once decoded, the PCM (pulse code modulation) audio data is transferred in one of three ways: the CPU delivers the PCM audio data to the South Bridge (element 32 in FIG. 3) FIFO buffer, the DMA (direct memory access) in the South Bridge transfers the data internally within the South Bridge to the FIFO buffer; or the special purpose circuit transfers the data to the FIFO buffer from the LPC interface 62. The FIFO buffer then sequentially feeds each piece of decoded music to a CODEC 108 (also see element 42 in FIG. 3), through the special purpose circuit of the present invention, where the decoded signal is converted from digital to analog. Then the output signal from the CODEC 108 is amplified by an amplifier 110 (also see element 44 in FIG. 3) to drive a speaker (see element 46 in FIG. 3) and/or headset (not shown in FIG. 3).

$5^{th}$ step: While the final song of the first set from the play list is playing from memory, the file management software of the present invention stored in the RAM 104 returns control to the $4^{th}$ step to retrieve the next set of compressed music files from the RAM 104, as determined by the earlier scripted song play list developed in the $1^{st}$ step. Thus, the $4^{th}$ and $5^{th}$ steps are repeated for each set of compressed music files until the last music selection in the set plays. At that point in time control returns to the $3^{rd}$ step to load another set from the play list, which is similarly played through the $4^{th}$ and $5^{th}$ steps. When the last song is played from the overall play list of the $2^{nd}$ step, or when the user turns off the music player function, the operation of the player ceases.

The mini-OS power saving software of the present invention ensures that the CPU, Peripheral Chips, HDD and other controllable system elements will be in an idle state for the highest percentage time possible. An interesting attribute of the solution offered by the present invention is that the higher the MIPS (Million Instructions Per Second) capacity of the CPU, the smaller percentage of time the CPU will spend performing the decoding function. This means that higher performance CPUs will demonstrate even lower power usage when playing compressed music, thus saving even more battery power and further extending the length of time that the battery can maintain sufficient charge to power the portable computer.

The mini-OS monitors the audio control buttons (e.g., play, fast forward, rewind, pause, scan, previous track, next track, first track, last track, fast forward/rewind while listening, audio source/media select, etc.) (see element 48 in FIG. 3) for user actuation through the special purpose circuit (see element 40 in FIG. 3) of the present invention, and communicates user requests to the mini-OS file management software of the present invention. Optionally, a small LCD (see element 34 in FIG. 3) can be connected to the special purpose circuit to provide visual status indicators (e.g., song #, song titles, track #, playtime & icons) under control of the mini-OS display management subroutines.

The mini-OS power saving software of the present invention primarily manages the usage of the CPU, and the MP3 storage devices such as CD, HDD, and flash media such as SD (Secure Digital) cards, MMC (Multimedia Card), memory stick, and SMC (Smart Media Card), while maintaining the rest of the system, including the memory, corelogic chipsets, in a fully on and functional state. Secondary power saving is applied to other PC subsystems to minimize power usage still further by putting them in an idle state.

For example, with a 500 MHz Pentium III CPU having about 225 MIPS of processing power and the decoding algorithm requiring about 15 MIPS, the CPU will be operating less than 10% of the time. The other 90-95% of the time the CPU will be in a standby mode that requires only milliamps of current. Alternatively, the CPU can be run at a slower clock speed, which is usually an option provided by most of today CPUs, such as the AMD's Athlon CPU. Similarly, the HDD is accessed during the time it takes to fill or refill the RAM. Thus, since the average song takes about 4 minutes to play and the RAM holds about 30 songs for 120 minutes of play time; a ration of 1:240, less than 0.5% of full power operating time. These factors add to the power savings gained by using the mini-OS of the present invention instead of the full operating system (the full OS) of the portable computer. The result of the overall power consumption of the present invention is very low when the portable computer is in the music play mode, and that directly translates into the battery maintaining a useful charge level for a much longer time than allowed by the prior art. As those skilled in the art will recognize, the compressed music data of this invention may reside on a hard disk, on other magnetic (e.g., tape) media, optical (e.g., CD-ROM) media, flash media (e.g., SD cards, MMC, memory stick, SMC), or any other storage medium.

FIG. 3 is a generalized overall block diagram of an exemplary system 31 consistent with one embodiment of the present invention. The majority of the blocks in system 31 are components known in the art and are generally included in all PC computers for producing sound through the speaker of the computer. Shown here is a system clock 56, which, for simplicity of FIG. 3, is not shown connected to the various components that need a clock signal. Additionally, a CPU 26 is shown interfacing with the North Bridge 28. In turn, the North Bridge 28 interfaces with a system RAM 30 and the South Bridge 32. Then the South Bridge 32 interfaces with the HDD 36 and a CD-ROM 38. Typically the South Bridge 32 also interfaces directly with the CODEC 42 through AC_link; however, in the exemplary system 31 shown, the special purpose circuit 40 (see discussion of FIG. 4 below) is inserted between the South Bridge 32 and the CODEC 42 to enable the playing of compressed digital audio in conjunction with a mini-OS 80 of the present invention from the system RAM 30, without affecting the ability to play non-compressed analog audio. In this configuration, the mini-OS 80 is stored in the BIOS, although those skilled in the art will recognize that the mini-OS 80 could alternatively be stored in its own ROM (either within the special purpose circuit 40 or external to it), a hard disk, or other media. Thus, $AC\_link_1$ from Sough Bridge 32 is coupled to the special purpose circuit 40, which performs the decompression function as necessary, and then provides any audio signals to the CODEC 42 via $AC\_link_2$. The CODEC 42 them performs the usual function on all signals received from the special purpose circuit 40 and applies the audio signals to an amplifier 44, to be played on speaker 46 or headset (not shown). In system 31, $AC\_link_1$ looks and behaves like the standard AC_link to the South Bridge 32, and $AC\_link_2$ looks and behaves like the standard AC_link to the CODEC 42, making it appear to those portions of the computer that audio functions are being performed as during normal (i.e., known in the art) audio play, thus having minimal or no impact on the operation of the South Bridge 32 and the CODEC 42. Also shown in FIG. 3 are the function keys 48, the small ICD 34 and an audio player power switch 54, which function as described hereinbelow with reference to FIG. 4.

Figure 4:
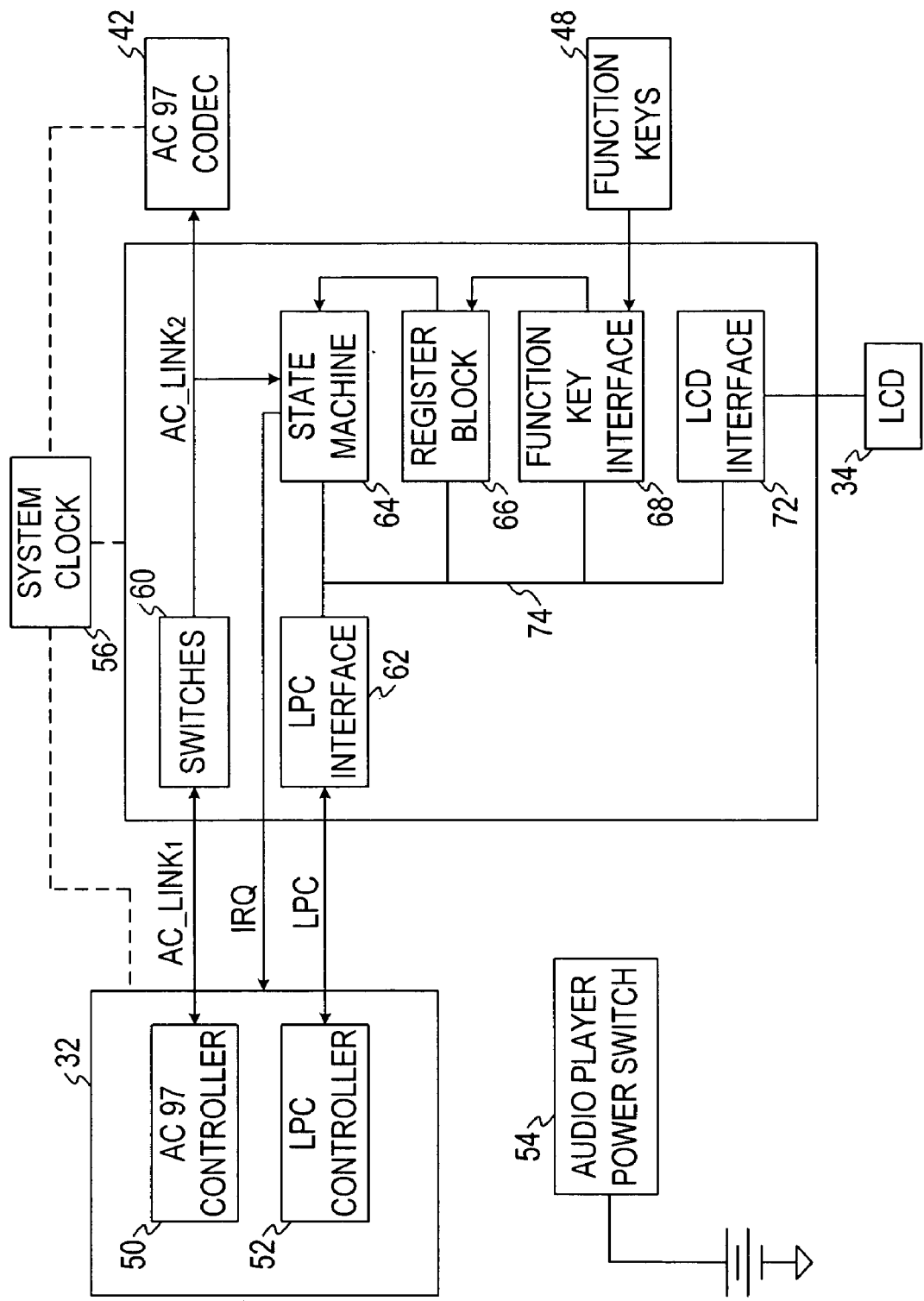
FIG. 4 is a block diagram of the internal portion of an exemplary special purpose circuit, in relation to the other components that interface with it, in one embodiment of the present invention.

FIG. 4 includes a detailed block diagram of the internals of the special purpose circuit 40 and related details of the other portions of the computer that the special purpose circuit 40 interfaces without showing all of the details of the rest of the computer system. The special purpose circuit 40 may be produced as an IC, (i.e., the IC 40) to minimize the PCB space needed to incorporate embodiments of the present invention into portable computers. The South Bridge 32 is shown with a standard AC 97 controller 50 and a LPC (low pin count) controller 52 to the left of the special purpose circuit 40 with the standard bidirectional links $AC\_link_1$ and LPC Bus between them, and the unidirectional IRQ (Interrupt Request) link from the special purpose circuit 40 to the South Bridge 32. To the right, the special purpose circuit 40 provides uncompressed audio to the AC 97 CODEC 42 (i.e., the CODEC 42) via $AC\_link_2$. Also, to the right, the function keys 48, and below the ICD 34, are each shown connected to the special purpose circuit 40. Additionally, FIG. 4 includes the system clock 56 connected to various components, and in the lower left, the audio player power switch 54. The audio player power switch 54 is provided so that when the user initiates the player mode via the audio player power switch 54, only the mini-OS (instead of the full OS) is initiated, for use in a system consistent with the present invention.

Internal to the special purpose circuit 40 are switches 60 that interface with both $AC\_link_1$ and $AC\_link_2$ and function in response to settings in an internal register of a register block 66, with the switches 60 closed connecting $AC\_link_1$ with $AC\_link_2$ when the PC functions normally with the full OS, and with the switches 60 open when a system consistent with the present invention is employed. The LPC path is coupled to a LPC interface 62. The switches 60 and AC_link2 are coupled to a state machine 64, while another port of the state machine 64 is coupled, via bus 74, to the output of the LPC interface 62, as well as the register block 66, a function key interface 68 and a ICD interface 72. A second port of the register block 66 is also coupled to a third port of the state machine 64. The function keys 48 are coupled to the function key interface 68, and the ICD 34 is coupled to the ICD interface 72. Also, the function key interface 68 provides a signal to the register block 66 when one of the function keys 48 is selected by the user. The audio player power switch 54, which is operated by the user in the second step discussed above, may be used to activate the PC to operate as described hereinabove. The audio player power switch 54 is shown connected to the DC voltage source of the portable computer and not to any particular block in FIG. 4, since that connection varies depending on several factors controlled by the manufacturer of the computer on which an embodiment of the present invention is installed.

More specifically, the blocks within the special purpose circuit 40 operate as follows:

LPC Interface

The special purpose circuit 40 includes LPC (low pin count) interface 62 to interface with the LPC controller 52 in the South Bridge 32. The LPC interface 62 is used by the CPU 26 to:
(1) read the function key input registers in the register block 66;
(2) set the control register in the register block 66 to control the AC 97 CODEC 42;
(3) get the PCM (pulse code modulation) audio data from the system memory (the system RAM 30); and
(4) perform clock throttling control.

The setting in the mode register of the register block 66 controls the state of the switches 60 to switch the special purpose circuit 40 between a normal computer operation mode (i.e., normal operation mode) with the switches 60 closed (e.g., running Microsoft Windows® OS) and the mode of a system consistent with the present invention, with the switches 60 open (running the mini-OS) to play compressed audio files.

South Bridge AC 97 Controller 50 Interface (AC $Link_1$ from Host)

During the normal computer operation mode, the switches 60 are closed with the South Bridge AC 97 controller 50 interface connected directly through, closed the switches 60, to the AC 97 CODEC 42 to generate audio output as if the special purpose circuit 40 were not present. To play compressed audio files, the switches 60 are open when the mini-OS is running, and the state machine 64 controls the AC 97 CODEC 42.

AC 97 CODEC Interface (AC Link$_2$ to AC 97 CODEC 42)

When the computer is running under control of the mini-OS, the switches 60 are open. The state machine 64 then controls the AC_link$_2$ in response to the settings of the register block 66 set by the host (the CPU 26) to generate the controls for the AC 97 CODEC 42 (e.g., switching the sampling frequency, controlling volume, sending the PCM audio data to the CODEC 42, setting the CODEC 42 to the power saving mode or waking the CODEC 42 from the power saving mode).

Function Key Interface 68

The function key interface 68 receives the user selections from the function keys 48 and stores the selections in internal registers to be read by the CPU 26.

LCD Interface 72

The ICD interface 72 is only necessary if the ICD 34 is used to provide status information to the user. The purpose, when used, is to show player status on the low cost ICD 34 when the system consistent with the present invention is used. Status of the audio track number of the selection playing, status icons (e.g., play) and other generic status icons may by programmed into the system and displayed for any other purpose.

Operation Modes (A) Normal Operation Mode: When the PC is fully powered and running under the full OS, the various functions of the special purpose circuit 40 are bypassed and the switches 60 are closed, as discussed above. In the normal operation mode, the computer system uses the South Bridge AC 97 Controller 50 to directly control the AC 97 CODEC 42 through the AC_link (in the normal operation mode AC_link$_1$ and AC_link$_2$ are the same since the switches 60 are closed). The special purpose circuit 40 does not intercept or modify the AC_link signals.

(B) Compressed Audio Performance Mode: When the audio player power switch 54 has been closed, the system runs under the control of mini-OS, and the special purpose circuit 40 is empowered and runs in the compressed audio performance mode. The South Bridge AC 97 Controller 50 is isolated from the AC 97 CODEC 42 in this mode since the switches 60 are open.

In the compressed audio performance mode, the host (the CPU 26) sets the internal registers of the register block 66 to control the data flow to the AC97 CODEC 42, and to perform the various power management functions

A Power Saving Control Method in the Compressed Audio Performance Mode

A flexible control method of the special purpose circuit 40 is provided to minimize the system control cycles and power consumption in the compressed audio performance mode. The system memory (the system RAM 30) is used to pass most of the control commands to the special purpose circuit 40, instead of the CPU 26, which minimizes the time that the CPU 26 needs to access high speed external bus other than a standby level. This considerably reduces the power load on the portable computer battery in this mode.

The CPU 26 also sets the system control memory registers in the register block 66. The state machine 64 bases its operation on those register settings to obtain control words and PCM audio data automatically through the LPC interface 62. The control words in the system memory (the system RAM 30) are fetched into the internal registers, and the state machine 64 decodes the control words to determine if the PCM audio data is ready. If the audio data is ready, the state machine 64 continues to fetch the audio data and sent it to the AC 97 CODEC 42. The control words in the system memory (the system RAM 30) can also be used to indicate the sampling frequency of the PCM audio data. So, the state machine 64 can set the AC 97 CODEC 42 to the appropriate frequency before the PCM audio data is sent.

Those skilled in the art will recognize that a headphone or headset system may comprise further functionality than described hereinabove, e.g., a volume control, or the audio control buttons may be integrated thereto.

It should also be recognized that a special purpose circuit consistent with the invention may be integrated into a full-time compressed (and/or non-compressed) audio playing system capable of playing music regardless of the operation of the rest of the system. In this configuration, when the rest of the system is either fully on (S0) or in a "sleep" (suspend to RAM or S3) mode, the system may be configured to begin execution of a custom or standard audio player, e.g., Music Match or Windows® Media Player, running under Windows®, which may be adapted to play the compressed audio files stored in the play list. In this scenario, the function buttons may be adapted for use in a passthrough-type mode using the accompanying software driver to control various features of the audio player software, e.g., Music Match, instead of controlling the special purpose circuit. When the primary operating system such as Windows® is either fully off (S5) or in a "hibernate" (suspend to HDD or S4) mode, operation of the special purpose circuit may proceed to play the compressed audio files from the play list as described hereinabove, wherein the function buttons control the special purpose circuit.

It is noted that the power states described above (i.e., fully on, sleep/suspend to RAM, fully off, hibernate/suspend to HDD) are often referred to using the Advanced Configuration and Power Interface ("ACPI") standard conventions, as follows: The typical operating system (e.g., Windows®) supports six system power states, referred to as S0 (fully on and operational) through S5 (power off). Each state is characterized by the following: power consumption, i.e. how much power the computer uses; software resumption, i.e., from what point the operating system restarts; hardware latency, i.e., how long it takes to return the computer to the working state; and system context, i.e., how much system context is retained, or whether the operating system must reboot to return to the working state. State S0 is the working state. State S1, S2, S3, and S4 are sleeping states, in which the computer appears off because of reduced power consumption but retains enough context to return to the working state without restarting the operating system. State S5 is the shutdown or off state. A system is waking when it is in transition from the shutdown state (S5) or any sleeping state (S1-S4) to the working state (S0), and it is going to sleep when it is in transition from the working state to any sleep state or the shutdown state. The system cannot enter one sleep state directly from another; it must always enter the working state before entering any sleep state. For example, a system cannot transition from state S2 to S4 or from state S4 to S2. It must first return to S0, from which it can enter the next sleep state. Because a system in an intermediate sleep state has already lost some operating context, it must return to the working state to restore that context before it can make an additional state transition.

Figure 2:
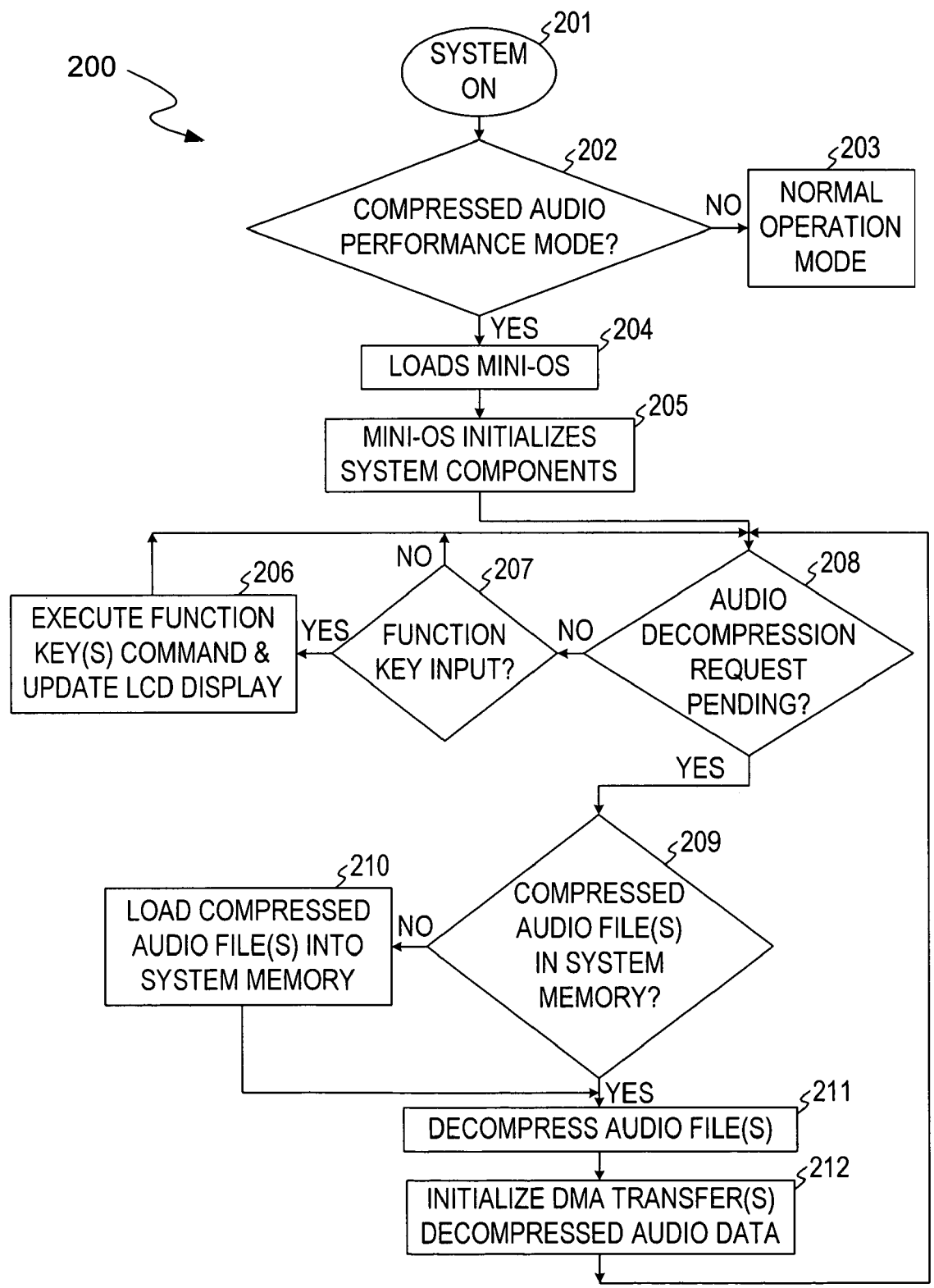
FIG. 2 is a flow diagram of an exemplary power up of the mini-OS and initiation of the player function, in one embodiment of the present invention.

Referring now to FIG. 2, in conjunction with FIG. 3, an exemplary sequence 200 for the power up of the mini-OS and initiation of the player function, in one embodiment of the present invention, is illustrated. As stated above at some time prior to the initiation of the audio player function of a PC equipped with the present invention, the user downloads (not shown in FIG. 2) the audio files of interest to the HDD 36 or burns a CD-ROM that is placed in the CD-ROM driver 38 for use with the audio player feature of the present invention. As shown, at step 201, the sequence 200 begins when the user presses either the audio player power switch 54 or the computer's main power switch (not shown in FIG. 3), to turn the system on. A determination is then made, at step 202, whether the computer is to boot in the normal operation mode or the compressed audio performance mode. This determination is typically made in the BIOS, based on whether the computer's power switch or the audio player power switch 54 is used to turn on the computer, although those skilled in the art will recognize that this determination could alternatively be made by an application program or an operating system that provides such capability (e.g. Windows® 98). If the computer's power switch is used to turn on the computer, then the system boots to the normal operation mode, at step 203, and the normal operating system (e.g., Windows® 98) is loaded into the system RAM 30 and executed. If the audio player power switch 54 is used to turn on the computer, the mini-OS is loaded into the system RAM 30, at step 204. At step 205, the mini-OS initializes the system components including one or more of the North Bridge 28, the South Bridge 32, the special purpose circuit 40, the hard disk drive 36, the CD-ROM drive 38, the CODEC 42, and the CPU 26.

Since no audio decompression request will be pending upon system initialization (i.e., the memory buffer is not full), which determination is made at step 208, the system waits for input from one of the function keys 48, at step 207, until one of the function keys 48 is pressed, at which point the appropriate function is executed and the ICD display is updated, as appropriate, at step 206. If the command includes a request from the user to play audio, an audio decompression request will be pending at this time, which determination is made at step 208. Since no compressed audio file(s) are in the system RAM 30 upon the initial request to play audio, which determination is made at step 209, the compressed audio file(s) are read from the HDD 36 and/or the CD-ROM drive 38 and/or the portable memory media 82 and loaded into the system RAM 30, at step 210. After the compressed audio file(s) are loaded into the system memory (the system RAM 30) at step 210, or if the audio file(s) are already in the system RAM 30, which determination is made at step 209, the audio file(s) are then decompressed, at step 211, using the system CPU 26. DMA transfer(s) to the CODEC 42 are initialized for the decompressed audio data, at step 212, and then the output signal from the CODEC 42 is amplified (not shown in FIG. 2) by the amplifier 44 to drive the speaker 46 and/or headset (not shown). After the DMA transfer(s) are initialized, at step 212, control loops back to step 208, to determine whether an audio decompression request is pending.

Playlist Software Operation

Figure 5:
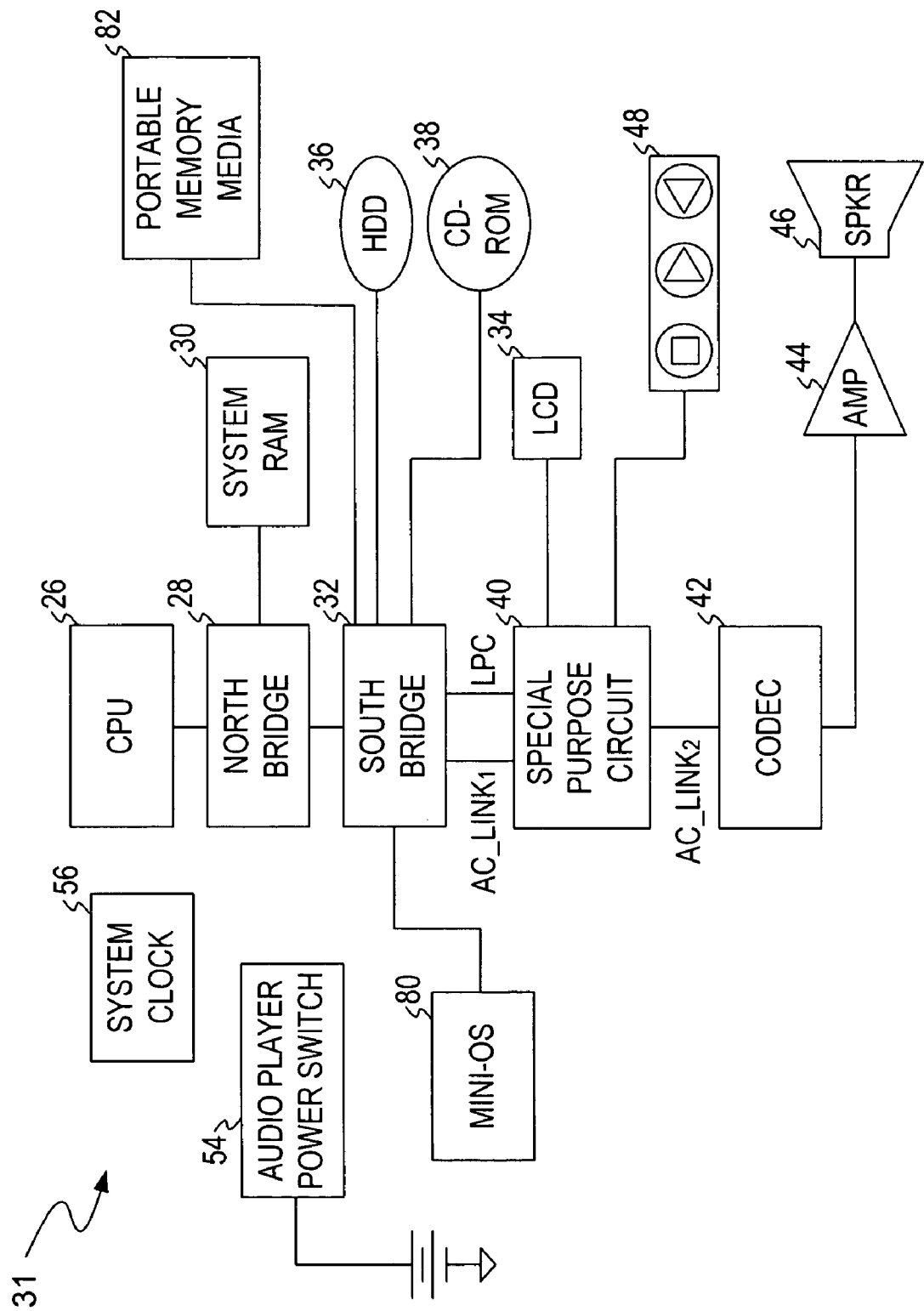
FIG. 5 is another block diagram of an exemplary audio player system consistent with another embodiment of the present invention.

FIG. 5 is another generalized overall block diagram of an exemplary system 31 consistent with another embodiment of the present invention. In this exemplary embodiment, the system 31 includes a portable memory media 82 that can be used to hold the playlist data and/or compressed file data. The portable memory media 82 can be Smart Card media, Memory Stick media, PCMCIA memory media and/or other portable memory media known in the art. If the system is ON and media is detected as being present at the portable memory media location (e.g., by insertion of a Smart Card, PCMCIA, CardBus card, Memory Stick or other media into an appropriate slot), the memory reader generates an interrupt to the South Bridge 32. The special purpose circuit 40 of this embodiment also receives the interrupt and generates a command to tell the operating system to launch an appropriate application (e.g., Windows Media Player) to read the playlist data on the portable memory media 82. In this instance, the application takes control to read the playlist file and retrieve the audio data, either from the portable memory media 82 or some other location specified in the playlist file. Similarly, when the mini-OS 80 is operational, the special purpose circuit 40 is adapted to check if the portable memory media 82 is present, and to scan the device for playlist data. The system then operates as described above.

The playlist file, as described herein, is a generalized data file that is constructed by a user having a desired MP3 song sequence. The playlist file also includes disk path information to instruct the application as to where to locate the desired MP3 data. Certain operating systems permit users to change drive letters on-the-fly. Accordingly, the playlist software reads the volume serial number (VSN) given by the operating system to a particular drive. The volume serial number does not change (unless intentionally changed by reformatting the drive), and thus, the playlist software can track the playlist data regardless if the user reassigns a particular drive letter. This feature also works similarly with switchable devices such as disk drives.

It should be recognized by those skilled in the art that, although the above-described embodiments utilize a hardware-based OS selection (i.e., pressing main power button boots to Windows®, while pressing audio control button boots to the mini-OS), other OS selection method are contemplated, as well. Such selection methods include, e.g., using a batch file or other scripting or software-based method to shut down the first OS and boot to the second OS. Those skilled in the art will also recognize that the mini-OS of the present invention could conceivably be implemented as part of a larger OS (e.g., a GUI-based OS, such as Windows®, LINUX, etc.) or as a software component named something other than an "operating system", (e.g., a "driver", an "algorithm", a "script", "code", a "program", an "executable", a "routine", a "subroutine", a "utility", etc.), instead of being implemented as an entirely separate operating system. Such embodiments are contemplated to be within the scope of the present invention.

Software Operation

Figure 6:
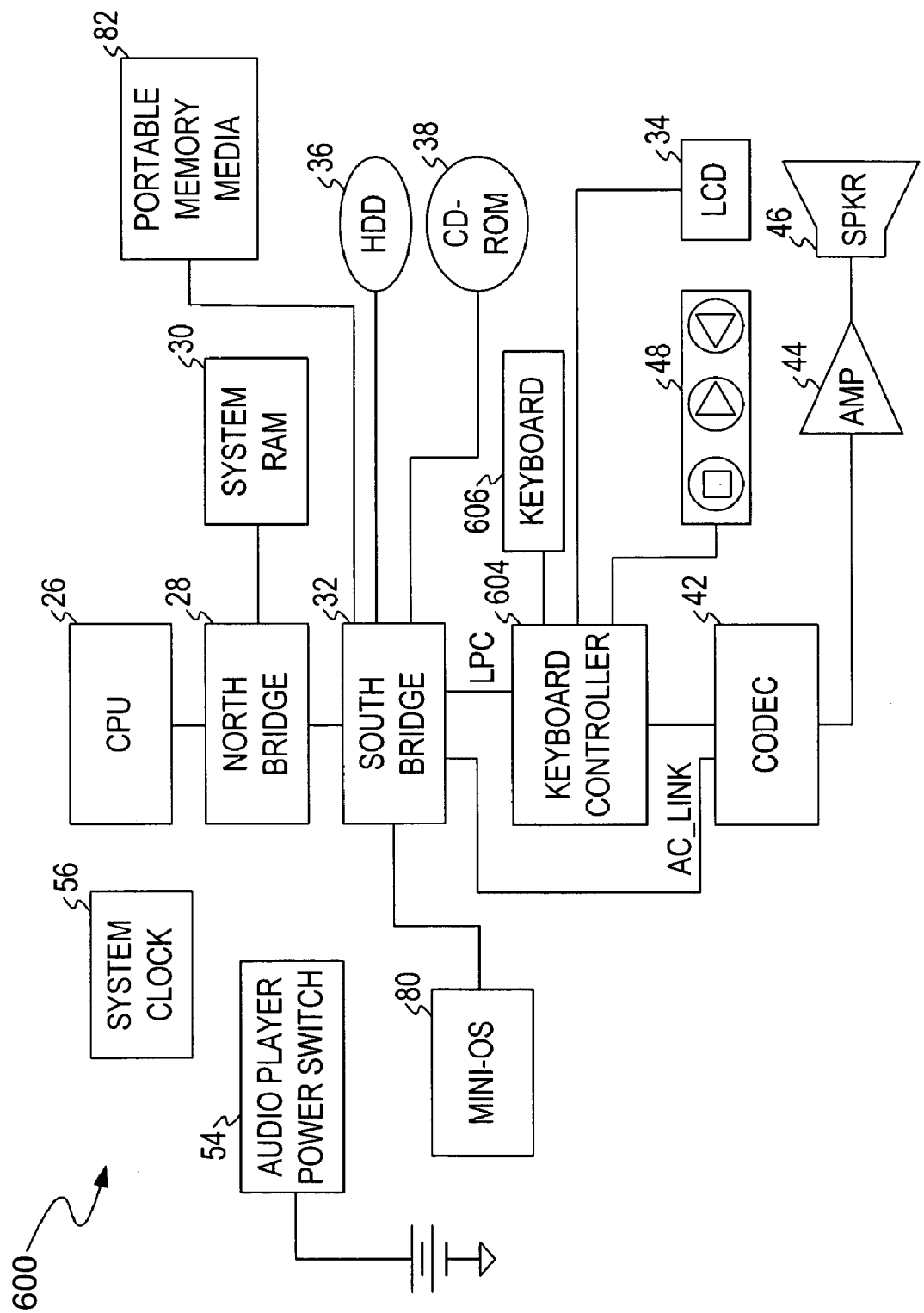
FIG. 6 is another block diagram of an exemplary audio player system consistent with another embodiment of the invention which utilizes software only for audio decoding and playing.

Turning to FIG. 6, a generalized block diagram of another exemplary computer system 600 consistent with the invention is illustrated. The computer system 600 is similar to the earlier described embodiments of FIGS. 3-5, except that the computer system 600 employs a purely software solution for operation of the computer system 600 in the compressed audio performance mode instead of utilizing the special purpose circuit 40 (hardware) as previously described. As such, the software solution enables the computer system 600 to have all the functionality, including operation of a PC in the compressed audio performance mode, of all the embodiments of the invention as previously described.

The computer system 600 includes all the conventional components detailed earlier with respect to FIGS. 3 and 5 and hence any repetitive description of those components and their operation is omitted herein for clarity. In addition to those earlier described components, the computer system 600 includes a conventional keyboard controller 604 adapted to interface with the audio control buttons 48 (the function keys 48), the ICD 34, and a keyboard 606.

Operation of the computer system 600 in the compressed audio performance mode is controlled by audio software adapted to be executed by a processor. As such, operation of such audio software requires the processor and a machine-readable medium. The processor, e.g., the CPU 26, can be any type of processor capable of providing the speed and functionality required by embodiments of the invention. For example, the processor could be a processor from the Pentium® family of processors made by Intel Corporation.

The machine-readable media can be any type of media capable of storing instructions adapted to be executed by the processor. Some examples of such media include, but are not limited to, the system RAM 30, read only memory (ROM), programmable ROM, magnetic disk (e.g., floppy disk and the HDD 36), optical disk (e.g., the CD/DVD ROM 38), and any other device that can store digital information. As used herein, the phrase "adapted to be executed by a processor" is meant to encompass instructions stored in a compressed and/or encrypted format, as well as instructions that have to be compiled or installed by an installer before being executed by the processor. The processor and machine-readable medium may be part of the computer system 600 where various combinations of machine-readable media store combinations of the audio software which are accessible by the processor through various controllers.

The audio software provides all the functionality to load and operate the mini-OS 80 and hence the PC system as previously detailed. Again, the mini-OS 80 itself could be implemented as part of the larger OS or could be an "algorithm", a "script", a "code", a "program", a "routine" or a "subroutine".

Operation of the computer system 600 is detailed below with reference to the exemplary sequence 200 of FIG. 2. As earlier detailed, at some time prior to the initiation of the audio player function of a PC equipped with the present invention, the user downloads (not shown in FIG. 2) the audio files of interest to the HDD 36 or burns a CD-ROM that is placed in the DC/DVD ROM drive 38 for use with the audio player feature of the present invention. As shown, at step 201, the sequence 200 begins when the user presses either the audio player power switch 54 or the computer's main power switch, to turn the system on. A determination is then made, at step 202, whether the computer is to boot in the normal operation mode or the compressed audio performance mode. This determination is typically made in the BOIS, based on whether the computer's power switch or the audio player power switch 54 is used to turn on the computer, although those skilled in the art will recognize that this determination could alternatively be made by an application program or an operating system that provides such capability (e.g. Windows® 98).

If the normal operation mode is desired, the system boots to the normal operation mode at step 203, and the normal OS, e.g., Windows® 98, is loaded into the system RAM 30 and executed. Just as the special purpose circuit 40 was bypassed in such a situation, audio software consistent with the invention is not responsive to a request to operate the PC in the normal operation mode.

If the compressed audio performance mode is desired, the audio software is enabled by one of a variety of enabling techniques. For instance, the audio player power switch 54 may be utilized or a software based selection technique may be utilized. Once the audio software is enabled, it instructs the system to load the mini-OS 80 in the system RAM 30 at step 204. Advantageously, the boot up time of the PC utilizing the mini-OS 80 to boot up in the compressed audio performance mode is faster than the boot up time of the PC utilizing a traditional OS to boot up in the normal operation mode. In this way, a user can quickly listen to a variety of audio files without waiting for the longer boot up time of the PC in the normal operation mode.

Then at step 205, the mini-OS 80 initializes the system components including one or more of the North Bridge 28, the South Bridge 32, the hard disk drive 36, the CD/DVD-ROM drive 38, the CODEC 42, and the CPU 26. In addition, the CPU 26 utilizes the audio software to control data flow to the CODEC 42 and to perform the various power management functions earlier detailed.

Since no audio decompression request will be pending upon system initialization (i.e., the memory buffer is not full), which determination is made at step 208, the system waits for input from one of the function keys 48, at step 207, until one of the function keys 48 is activated. At this time, the appropriate function is executed and the ICD display may be updated, as appropriate, at step 206. If the command includes a request from the user to play audio, an audio decompression request will be pending at this time, which determination is made at step 208.

Since no compressed audio file(s) are usually in the system memory (the system RAM 30) upon the initial request to play audio, which determination is made at step 209, the compressed audio file(s) are read from the HDD 36 and/or the CD/DVD-ROM drive 38 and/or the portable memory media 82 and loaded into the system RAM 30, at step 210. For instance, the compressed audio file(s) could be on a CD or DVD as read by the DC/DVD-ROM drive 38. After the compressed audio file(s) are loaded into the system memory at step 210, or if the audio file(s) are already in the system memory, which determination is made at step 209, the audio file(s) are then decompressed, at step 211, using the system CPU 26.

DMA transfer(s) to the CODEC 42 are initialized for the decompressed audio data, at step 212, and then the output signal from the CODEC 42 is amplified (not shown in FIG. 2) by the amplifier 44 to drive the speaker 46 and/or headset (not shown). After the DMA transfer(s) are initialized at step 212, control loops back to step 208, to determine whether an audio decompression request is pending.

Applications

Figure 7:
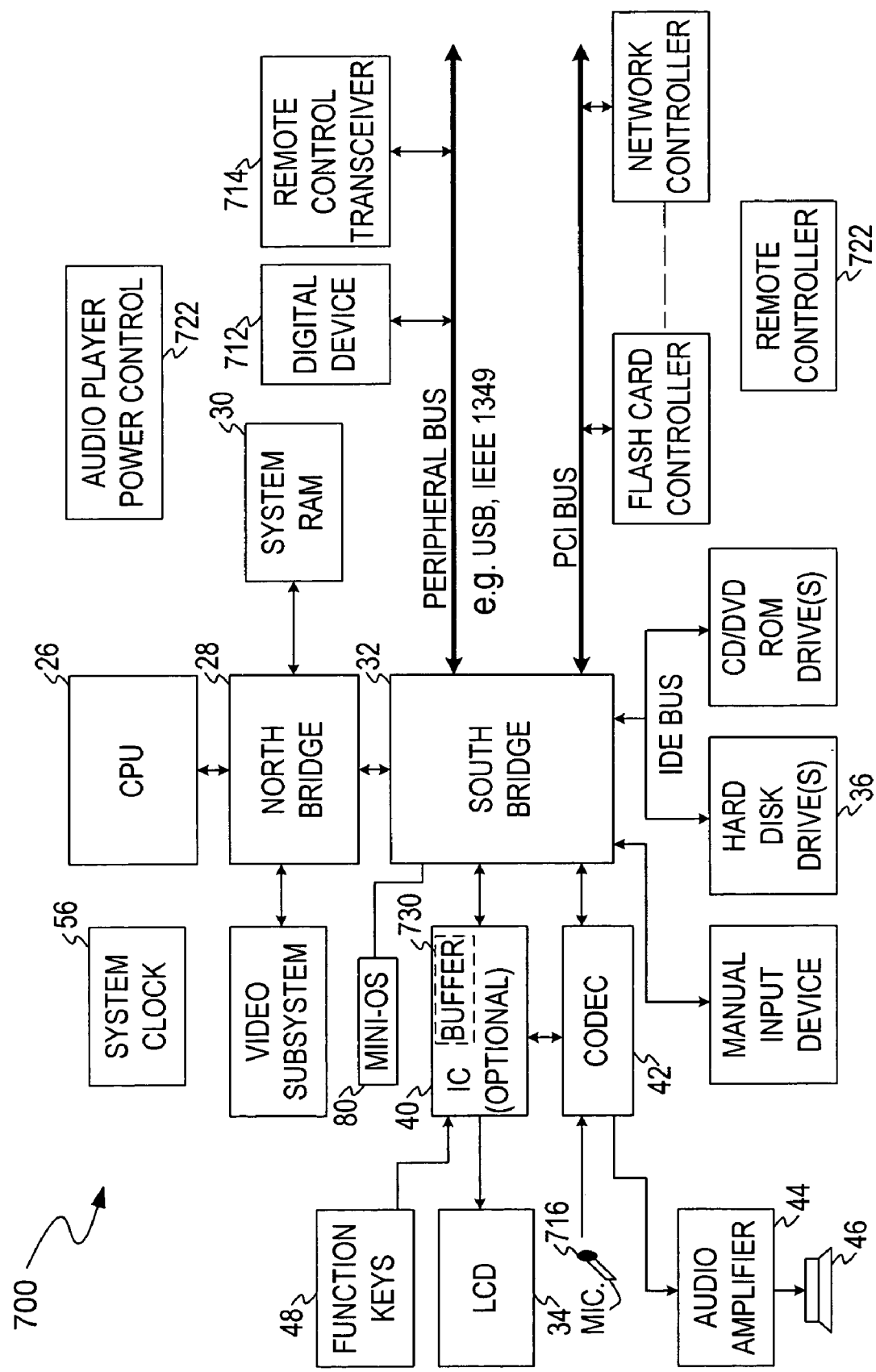
FIG. 7 is another block diagram of a computer system consistent with the invention to illustrate various applications that may be run by a computer system in a compressed audio performance mode.

Those skilled in the art will recognize a variety of software applications that may be utilized in the compressed audio performance mode provide improvements over those found in traditional computer systems and PCs. Several such applications include: 1) media selection; 2) voice recording; 3) taking and storing digital images; and 4) remote control applications. Each of these is addressed in more detail below with reference to the block diagram of a computer system 700 of FIG. 7. Each application may operate with software only and in some instances may operate in conjunction with the IC 40 (the special purpose circuit 40) to provide enhanced power management capabilities. The computer system 700 includes many components detailed earlier with respect to FIGS. 3, 5, and 6 where similar components are labeled similarly and hence any repetitive description of those components is omitted herein for clarity. The exemplary list of four applications is not exclusive and those skilled in the art will recognize a variety of other applications where operation of a computer system in the audio compression performance mode provides improvements over that found in traditional computer systems.

Media Selection

A plurality of compressed audio files may be stored in a variety of media of the computer system 700. Such media includes the HDD 36, a CD/DVD disk, a flash media card, etc. Such files may number into the thousands and hence such files are also typically organized in a directory structure, e.g., by song type, artist, album, etc. Advantageously, media selection software, which may be part of the mini-OS 80, is responsive to at least one function key to enable a user to search, access, and select an audio file or directory from the various media.

The typical function keys 48 may include a stop, play, pause, fast forward, rewind, and volume up and down keys. Typically, these function keys act independently to enable a user to select only one desired action. The media selection software consistent with the invention enables a user to first activate a combination or sequence of function keys to enter a directory mode. The directory mode enables a user to access various audio files and directories and enables the user to search, select, and store the various audio files using at least one function key. Once an audio file is found or stored, a user may exit the directory mode by again using at least one function key.

A variety of function keys, combinations or sequences of such function keys may be utilized to enter, navigate, and exit the director mode. For instance, one function key, e.g., the "stop" function key, may be used to enter the directory mode while music playback is stopped. Alternatively, two or more function keys, e.g., the volume up and volume down function keys, may be activated simultaneously to enter the directory mode. Once the directory mode is entered, one or more function keys may enable a user to navigate the various audio files in various directories of various media. Such navigation may enable a user to search, select, and store audio files. For instance, the fast forward and rewind keys may be used to search or scroll through various audio files and directories. The volume up and volume down, or any other set of function keys, may also be utilized in this instance. In addition, the ICD 34 may also be utilized in order to display directory information to enable users to search various directories more readily. Finally, a user may utilize one or more function keys to exit the directory mode. For instance, pressing the stop key may exit the directory mode. Once this mode is exited, a user may press the play function key to play a selected audio file.

Voice Recording Application

Voice recording software applications can be quickly provided when the computer system 700 is operating the mini-OS 80 in the compressed audio performance mode. In operation, a user of the computer system 700 may select a voice recording mode. The mini-OS 80 then enables the user to utilize an audio input device, e.g., a microphone 716, to input analog voice data. An analog to digital converter in the CODEC 42 then converts the input analog voice data signal to a digital audio signal. The IC 40 or the South Bridge 32 is programmed to receive the digital audio input signal from the CODEC 42 and send it to the system memory, e.g., the system RAM 30, by using master or DMA cycles.

The CPU 26 may them retrieve the voice data from the system RAM 30 and utilize a variety of voice coding techniques known to those skilled in the art to perform voice data compression. After compression, the smaller voice files may then be sent to a mass storage device, e.g., the hard dist drive 36, of the computer system 700 or it may be sent to a flash media card. If the voice file is stored in the flash memory card, it could be removed and put into any other computer system or compressed audio player which has a compatible flash card interface.

The voice recording software application may utilize the mini-OS 80 and IC 40 or may utilize only the mini-OS 80 without the IC 40. For the mini-OS 80 and IC 40 solution, the IC 40 may be utilized to keep the CPU 26 in low power states for the majority of time during a voice recording application. The IC 40 operates as previously described, e.g., with reference to the compressed audio performance mode including the power saving control method in the compressed audio performance mode. As such, the IC 40 enables power savings for the computer system 700 by enabling the CPU 26 to be put into lower power states while it is not performing particular functions such as compression of voice data. For instance, the CPU 26 could be maintained in a low power state when voice data is being transferred from the CODEC 42 to the system RAM 30. Since the voice recording software and compression software need generally little CPU time, the CPU 26 can advantageously be placed in the low power state for a significant amount of time. The IC 40 may also be used to wake up the CPU 26 periodically.

The IC 40 may additionally be equipped with a buffer 730, e.g., a first-in first-out (FIFO) buffer, to enable the CPU 26 to enter even deeper sleep modes for additional power savings. For instance, the CPU 26 has a plurality of power states while the computer system 700 is in a working state. One such state is a full power state. In this state, the CPU 26 consumes the most power relative to any other of several sleep states. The CPU 26 may also have a plurality of sleep states such as a light sleep state and a deep sleep state, where the CPU 26 consumes less power in the deep sleep state than in the light sleep state. The light sleep state may be further divided into a first light sleep state and a second light sleep state, wherein the CPU 26 consumes less power in the second light sleep state than in the first light sleep state.

In one embodiment, the CPU's full power state may be state C0, the first light sleep state may be state C1, the second light sleep state may be state C2, and the deep sleep state may be state C3 as those states are defined by the ACPI Specification. Those skilled in the art will recognize that the CPU 26 consumes less power in each successive sleep state C1, C2, C3 compared to the preceding state. However, the power consumption difference between each state depends on the system particulars.

Advantageously, the buffer 730 of the IC 40 enables the CPU 26 to enter a deep sleep state such as state C3. Without the buffer 730, the CPU 26 can at most enter state C2 in the voice recording application. The buffer 730 is configured to store voice data. When the buffer 730 reaches a predetermined low data condition, the IC 40 generates a deep sleep signal to the CPU 26 instructing the CPU 26 to enter a deep sleep state such as state C3. On the other hand, if the voice data in the buffer 730 reaches a predetermined full data condition, the IC 40 generates a wake up signal to the CPU 26 enabling the CPU 26 to perform voice compression. Those skilled in the art will appreciate that the buffer 730 has internal registers that may be programmed to provide the deep sleep signal and wake up signal depending on the volume of data in the buffer 730.

As an alternative, a mini-OS software only approach can be utilized to perform a similar voice recording application function without using the IC 40. A software only approach for operation of the computer system 600 in the compressed audio performance mode is previously described with reference to FIG. 6. In this voice recording application instance, operation of the computer system 700 would consume more power than the mini-OS 80 and IC 40 solution previously detailed because the CPU 26 could be placed in at most state C2 rather than state C3. In some instances where power consumption is less of a concern, e.g., a desktop computer system, a pure software approach with the mini-OS 80 only is an attractive approach since it is less expensive than the mini-OS 80 and IC 40 option earlier detailed.

Taking and Storing Digital Images

A variety of digital devices such as digital cameras, digital video recorders, or the like are external devices that take and store digital images on a variety of storage devices such as flash media cards. Some types of flash media cards include SmartMedia™, CompactFlash™, and Memory Stick® cards. Some of these digital devices, e.g., a digital camera or video recorder, may also be internal to, integrated with, or external to the computer system 700.

For such digital devices, operation of the computer system 700 in the compressed audio performance mode provides users with a way to take and store digital images without waiting for a long boot up time of the normal OS and while providing added power management capabilities. For taking digital images with a digital device 712 that is an internal or built-in digital device, a user may first boot up the computer system 700 in the audio compression performance mode rather than the normal operation mode. Associated digital device software may then prompt a user to select a digital device mode and enable the user to utilize the function keys 48 to instruct the digital device 712 to obtain digital data. For instance, the digital device 712 may be a digital camera that takes a digital picture image or a digital recorder that takes digital video. The digital image may then be displayed on a video display screen of the computer system 700 and/or such digital images may be stored on a mass storage medium, e.g., the HDD 36, of the computer system 700. The internal or external digital device 712 may be connected to the computer system 700 through a peripheral bus such as USB or IEEE 1394.

If the digital device 712 is external to the computer system 700, a user can utilize associated digital device software to import digital data from the digital device 712 and store such data on a mass storage device, e.g., the HDD 36. As such, the digital device software application provides a simple and easy interface for users to import digital data without waiting for a long boot up time for the normal OS. For example, if the digital device 712 is a digital camera external to the computer system 700, the digital device software permits a user to download digital images to a mass storage medium of the computer system 700.

Similar to the voice recording application earlier detailed, the digital camera application may be implemented by either the mini-OS 80 and IC 40 solution or the software only mini-OS 80 solution. If the digital device 712 is an internal device such as an internal digital camera, the mini-OS 80 and IC 40 solution can provide a power management function that enables the CPU 26 to be in a deep sleep power state such as state C3 until a picture is actually taken.

As an alternative, the software only mini-OS 80 approach can be utilized to perform a similar digital taking or storing function without using the IC 40. As with the voice recording application, the computer system 700 would consume more power in this instance because at most the CPU 26 could be placed in state C2. In some instances where power consumption is less of a concern, e.g., the desktop computer system, the pure software approach with the mini-OS 80 only is an attractive approach since it is less expensive than the mini-OS 80 and IC 40 option earlier detailed.

Remote Control Application

While the computer system 700 is operating in the compressed audio performance mode, remote control applications can be provided to essentially replace the function keys 48 and allow a user to remotely control several operations of the computer system 700. A remote controller 722 provides control signals to a remote control transceiver 714 of the computer system 700. The remote controller 722 could utilize any known type of control technologies such as Infrared or radio frequency (RF). The remote control transceiver 714, which may be integrated into the system bridge, receives control signals from the remote controller 722. Although not illustrated as such, the remote control transceiver 714 may also be integrated with the IC 40. The remote control transceiver 714 is powered even when the computer system 700 is off.

In operation, a user may utilize the remote controller 722 to activate a compressed audio button. An appropriate control signal is then sent to the remote control transceiver 714. If the computer system 700 is initially off, the remote control transceiver 714 sends a wake up signal to turn the computer system 700 on. The computer system 700 will check the remote control transceiver 714 at this point to see if the received control signal indicates that operation in the compressed audio performance mode is desired. If it is, the mini-OS 80 will be loaded into the system memory (the system RAM 30) and operation in the compressed audio performance mode will begin as earlier detailed with reference to activation of the audio player power switch 54.

As such, a user of the computer system 700 can access available functions and applications available in the compressed audio performance mode via the remote controller 722 without having to physically activate appropriate keys, e.g., the function keys 48, of the computer system 700. The same remote controller 722 may also have a normal power on button to enable powering up of the computer system 700 in the normal operation mode where the normal OS would be loaded into the system memory (the system RAM 30). Au such, the remote controller 722 may also be used to control other functions in the normal operation mode.

Entertainment Mode

In addition to operation in the compressed audio performance mode, PCs are constantly being upgraded to include a host of entertainment applications not typically associated with traditional PC computing applications. For instance, such entertainment applications include, but are not limited to, two audio playback applications including Internet radio and compressed audio playback, DVD movie playback applications, TV viewing applications, digital device applications, remote control applications, voice recording applications, etc. Just as selection of the compressed audio performance mode for quick access to audio playback and other applications is advantageous, so would selection of an entertainment mode for quick access to entertainment applications offered by the PC. As such, a user of a PC could make a selection for operation of the PC in the normal operation mode or in the entertainment mode. Such selection could be hardware based, e.g., activation of a particular entertainment button, or software based, e.g., via a selection menu. If the normal operation mode is selected, a typical boot sequence and loading of a primary operating system, e.g., Windows, would result. If the entertainment mode is selected, a boot sequence and loading of an alternate operating system, e.g., the mini-OS 80 would result. As earlier detailed, the mini-OS 80 could be implemented as part of the larger OS, e.g., the mini-OS 80 could include those portions of the larger OS necessary for operation of the entertainment applications. As such, the mini-OS 80 could be a subset of the larger OS. The boot sequence as detailed herein to enable a user to gain quick access to the entertainment applications.

Quick Boot

Figure 8:
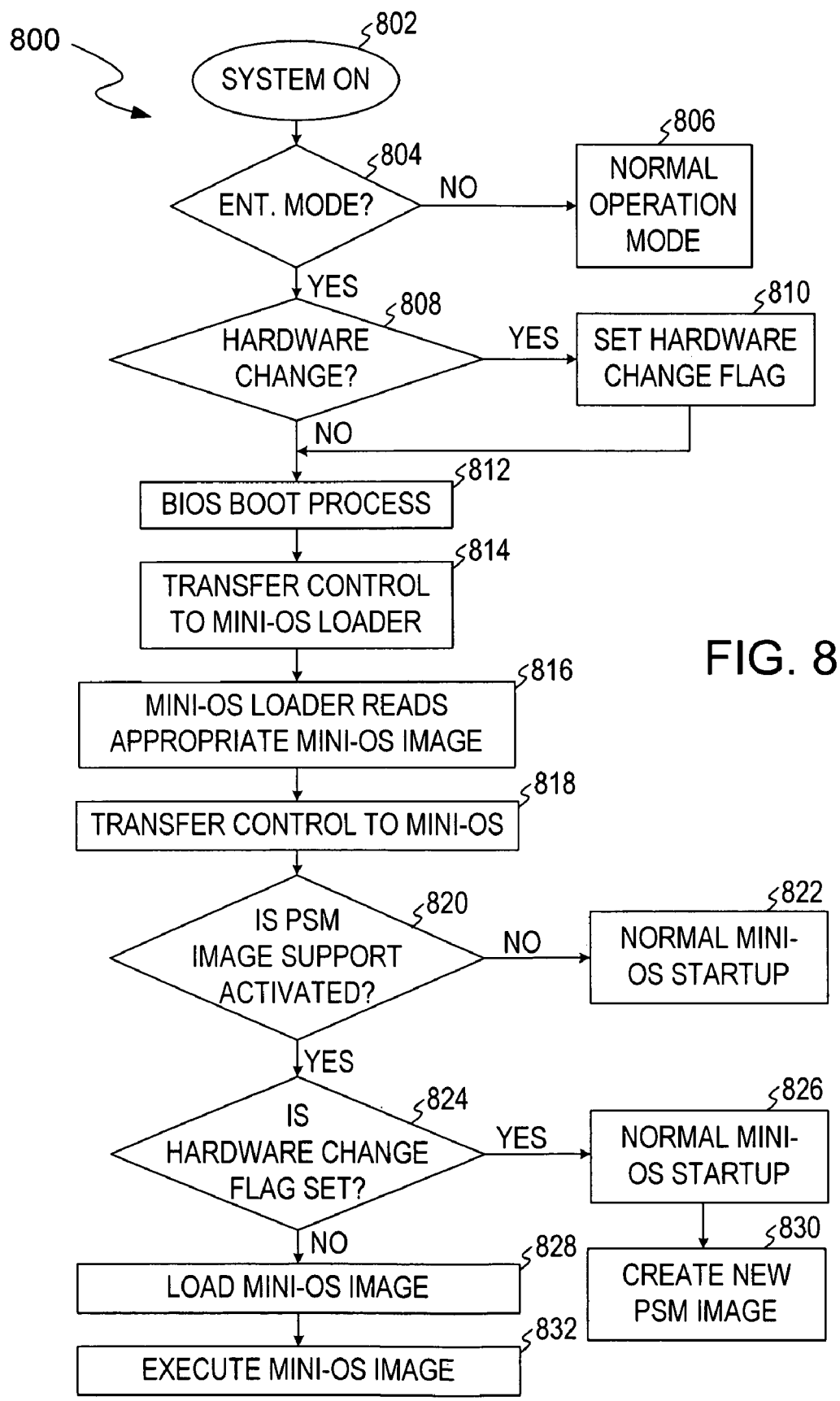
FIG. 8 is a flow chart of an exemplary power up of a computer system in an entertainment mode and an associated quick boot process.

Turning to FIG. 8, an exemplary flow chart 800 of a quick boot process is illustrated. The quick boot process is described herein with reference to booting of the mini-OS 80 for use when the PC is operated in the entertainment mode. Those skilled in the art will recognize that the quick boot process consistent with the invention could also be applied to speed up the boot process of other operation systems, e.g., the primary operating system. The quick boot process for the mini-OS 80 starts when the PC is turned on at step 802. A determination is made at step 804 as to determine whether operation in the entertainment mode is desired. This determination may be made in the BIOS depending, for example, on whether the PC main power switch or an entertainment mode switch is used to turn on the PC. As previously detailed, such a selection could also be software based. If the normal operation mode is desired, the system boots to the normal operation mode at step 806 and the normal OS, e.g., Windows®, is loaded into system RAM and executed.

If the entertainment mode is desired, a determination is made if any hardware has changed from the previous entertainment boot at step 808. This determination is typically made by the BIOS. If some hardware has changed, a hardware change flag may then be set at step 810. If the hardware has not changed, then no flag is set. Next, a BIOS boot process is performed at step 812. This may be a typical BIOS boot process or an accelerated BOIS boot process as later detailed herein with reference to FIG. 9. After the BOIS boot process at step 812, control is transferred to a mini-OS loader at step 814. The mini-OS loader will then read the appropriate mini-OS image at step 816. The mini-OS 80 may be part of the primary operating system or it may be located in some memory storage device. It may also be stored in a compressed format and, if so, the mini-OS loader would decompress the compressed format. At this point, control is then transferred to the mini-OS 80 at step 818.

Once control is transferred to the mini-OS 80 at step 818, it is determined if a Preconfigured Application Suite & Mini-OS Memory Image (PSM image) support function is activated at step 820. If such PSM image support is not activated, then normal mini-OS startup would occur at step 822. The normal mini-OS startup includes selecting and loading various software modules that could be utilized while the PC is operating in the entertainment mode.

If PSM image support is activated, it is then determined if the hardware change flag has been set at step 824. If the flag has been set indicating that the hardware configuration has changed since the last entertainment boot, then the normal mini-OS startup would occur at step 826. This normal mini-OS startup process would include performing mini-OS software module and application loading processed based on the new hardware configuration. In addition, since the PSM support is activated in this instance, a new PSM image file is created at step 830. Such a PSM image file may then be utilized in subsequent entertainment mode boot sequences.

If the hardware change flag is not set indicating that the hardware configuration has not changed from the previous entertainment mode boot sequence, then an appropriated PSM image file is immediately loaded at step 828 and executed at step 832. In this instance, the appropriate image file is the image file created on the previous entertainment mode boot.

In addition, a variety of PSM image files may be loaded depending on the circumstances. Again, such a PSM image file may typically be that of a previous boot in the entertainment mode where the hardware is unchanged from the previous boot. Another PSM image file may be based on the particular hardware present. A boot time mechanism should be provided in order to select which PSM image file to load at step 828. As such, the mini-OS startup is accelerated if the loaded configuration is captured in such a PSM image file. In an ideal case, the PSM image of a specific mini-OS and preloaded application suite can be captured immediately after start up using a suspend/resume like mechanism to allow fast restoration to a known PSM image configuration.

The PSM image file may typically include a "fingerprint" identifying the supported hardware configuration, a "splash screen" including the display contents at the time of the PSM image capture, and a memory image of that part of the memory in use by the mini-OS and the PSM image file at the time of the PSM image capture.

In addition, if the mini-OS 80 is a scaled down version of the primary OS or a subset of the primary operating system, the boot process can be sped up even more by automatically unloading software modules that would not be required for the entertainment mode when the computer system operating with the primary operating system is shut down. Therefore, when the compute system is started up again in the entertainment mode, the mini-OS 80 as the scaled down version of the primary operating system will be able to be booted up much more quickly.

Figure 9:
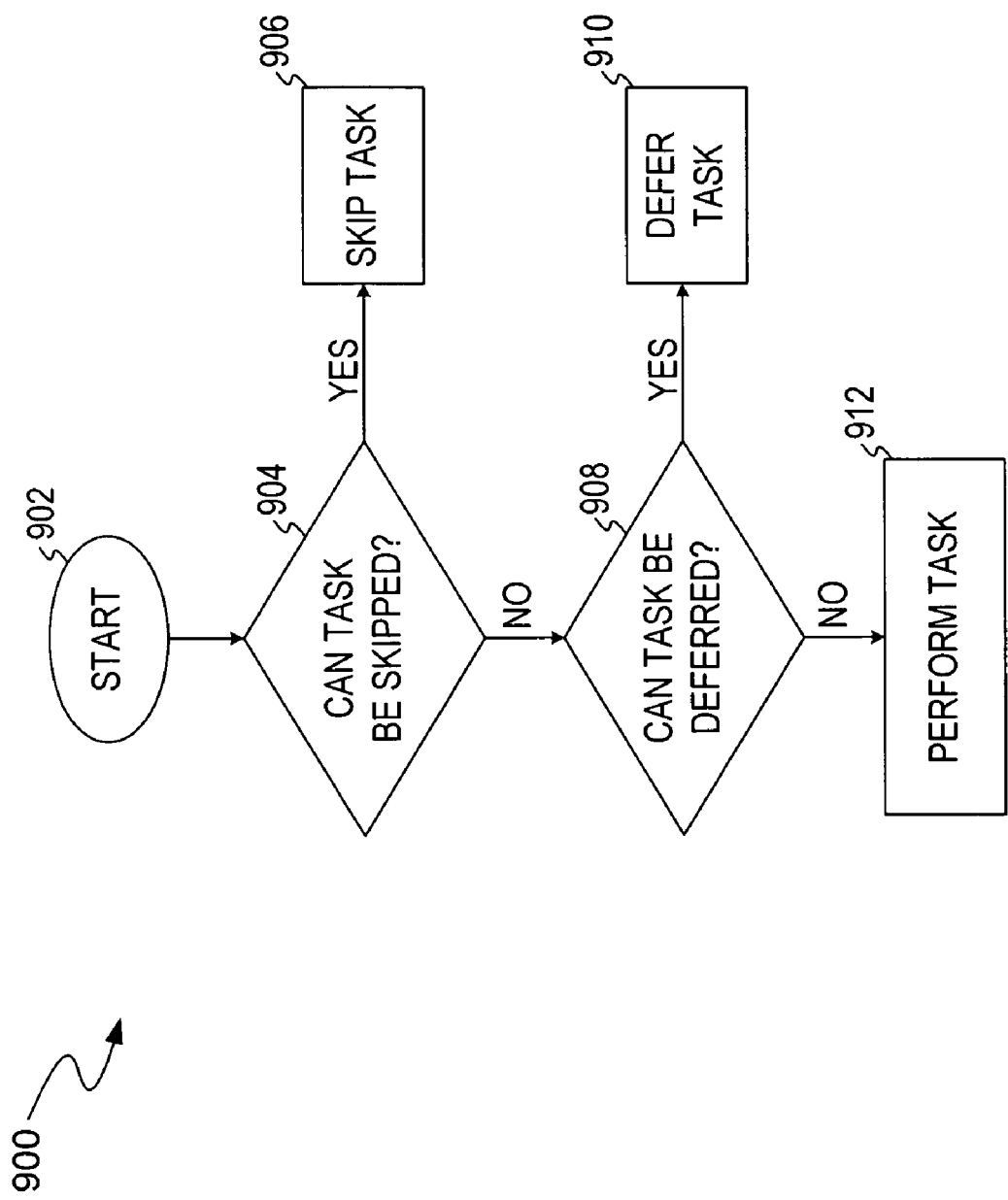
FIG. 9 is a flow chart of an exemplary accelerated BIOS boot process that may be utilized as the BIOS boot process of FIG. 8.

Turing to FIG. 9, a flow chart 900 of an accelerated BOIS boot process is illustrated. The accelerated BOIS boot process may be utilized as the BIOS boot process 812 of FIG. 8. The accelerated BIOS boot process may also be utilized with the primary OS when the normal operation mode is desired. When utilized in the entertainment mode, the accelerated BIOS boot process starts at step 902 once the entertainment operation mode has been selected. The BIOS determines if any tasks of the typical BIOS operation can be skipped at step 904. If any tasks can be skipped, then such tasks are skipped at step 906 thus saving the time to perform such tasks. For instance, all hardware checks for devices not necessary for the entertainment mode can be skipped. Any hardware checks for hardware required for mini-OS startup should typically not be skipped. Memory test tasks may also be skipped.

If tasks cannot be skipped, the accelerated boot process determines if such tasks may be deferred or delayed at step 908. If such task can be deferred until a later time, then such task is deferred at step 910. For instance, such a task that may be deferred includes deferring reading data from a disk after the disk is spun up. Any other tasks, where practical, should also be deferred. Such tasks can be deferred to a later time after the mini-OS 80 has been properly loaded. If such tasks are not deferred, the tasks will be performed at step 912.

Parental Control

A computer system operating in the normal operation mode or in the entertainment mode may enable a user to have access to a variety of entertainment applications, e.g., DVD movie playback, TV, audio applications, etc. Such a computer system may also be utilized by children of various ages. Parents or other caretakers of such children may wish to control the content of various entertainment applications as well as the time such applications are available. In addition, the parents may also wish to allow different children of differing ages or maturity levels access to different content, e.g., it may be desirable to allow one child access to only General Audience "G" rated movies while allowing another access to Parental Guidance Suggested "PG" rated movies, as well as track activity of children while using such entertainment applications.

Figure 10:
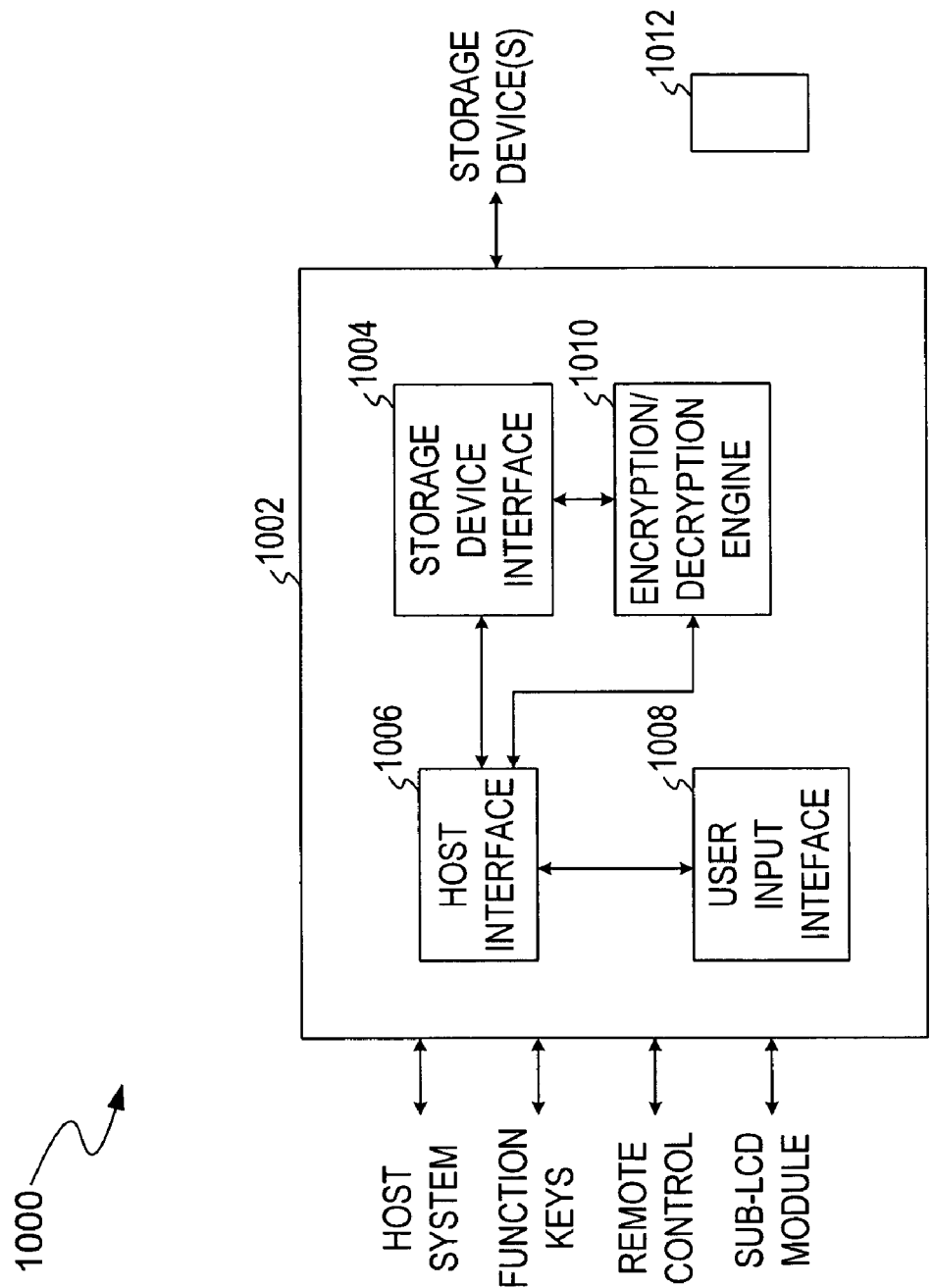
FIG. 10 is a block diagram of a parental control system consistent with another embodiment of the present invention.

Turning to FIG. 10, a block diagram of a parental control system 1000 consistent with the invention including a parental control integrated circuit (IC) 1002 and an external storage device 1012 to provide such parental control functionality is illustrated. The parental control IC 1002 may be part of a computer system having other components known in the art. In general, the parental control IC 1002 cooperates with the external storage device 1012 to provide such parental control functions. The external storage device 1012 may contain encrypted data particular to an individual child or class of children. The external storage device 1012 may be any variety of devices for storing data. For instance, the storage device may be a smart card, SD card, memory stick, compact flash card, etc. The parental control IC 1002 may be an individual IC or it may be integrated with other ICs in the computer system such as the CardBus controller or flash card reader to name just a couple. As such, integration with another IC typically reduces system cost and board size.

Upon operation of the computer system in the normal operation mode or the entertainment mode, a user (e.g., a child) inserts his/her associated storage device 1012 into the appropriate slot in the computer system. In general, the parental control IC 1002 acts as an interface between the external storage device 1012 and the host system to allow secure communication between the host system and the external storage device 1012 as further detailed herein. The parental control IC 1002 permits data on the external storage device 1012 to be properly read by the host system, such that the appropriate operating system of the host computer system, e.g., the mini-OS 80 if operating in the entertainment mode, can control the playback of various files of various entertainment applications according to the instructional data on the external storage device 1012. As such, the parental control IC 1002 receives a first coded signal from the external storage device 1012 and provides a second decoded signal to the host computer system that is understandable to the host computer system.

In general, the parental control IC 1002 includes a storage device interface 1004, a host interface 1006, a user input interface 1008, and an engine 1010, e.g., an encryption/decryption engine. The storage device interface 1004 provides a communication channel between the parental control IC 1002 and the external storage device 1012. Similarly, the host interface 1006 permits communication between the parental control IC 1002 and the host computer system. Communication between the parental control. IC 1002 and the host computer system may occur via any standard bus interface known in the art such as PCI, USB, I2C, SMBus, etc. The user input interface 1008 allows communication of user commands to the host interface 1006. For instance, user commands may be entered via function keys, e.g., the function keys 48, or via a remote controller, e.g., the remote controller 722 when the user is operating the computer system in the entertainment mode. User commands may also be entered via a keyboard or mouse. Once a user inputs a desired command, the user input interface 1008 interprets such commands and provides associated commands to the host interface 1006. The associated commands may then be provided to the host computer system via the host interface 1006. The appropriate operating system will evaluate user commands relative to signals received from the external storage device 1012 to determine if the user commands are appropriate. For instance, the mini-OS 80 in the entertainment mode would deny a user request to watch a Restricted rated ("R") DVD movie if instructional data in the external storage device 1012 indicated such content is not permitted for that particular user.

The engine 1010 of the parental control IC 1002 provides for secure communication between the external storage device 1012 and the host system. Data may be stored on the external storage device 1012 in a coded format, e.g., in an encrypted format, such that the external storage device 1012 may only be read by the associated parental control IC 1002. As such, when the host computer system needs to read data from the external storage device 1012, the decryption portion of the engine 1010 provides this function. On the other hand, when the host computer system needs to write data to the external storage device 1012, e.g., to create or change parental control data, the encryption portion of the engine 1010 provides this function. The engine 1010 can be implemented in hardware, software, or some combination thereof. In hardware, the engine 1010 could be implemented with a microprocessor or with hardwire logic as is known in the art.

In order to recover the contents of the instructional data located on the external storage device 1012 which may be provided to the parental control IC 1002 as a first coded signal, a correct decryption key is required by the decryption part of the engine 1010. The key is an algorithm that essentially "decodes" the work of the encryption algorithm. The key may also be used to make sure only the appropriate external storage devices 1012 are used with the computer system. For instance, a storage device created by an unauthorized user or machine should not be able to be read by the key of the decryption engine. If no valid external storage device is found, the appropriate operation system, e.g., the mini-OS 80 in the entertainment mode, may still allow a basic or general level of entertainment applications to be accessed and played.

The external storage device 1012 may be programmed to include instructional data for a particular child. Alternatively, the external storage device 1012 may be preprogrammed ahead of time such that a parent may have the programmed storage device 1012 immediately available to them upon purchase of the computer system without having to program their own storage device. Such a preprogrammed storage device may be for a particular class of child, e.g., children between the ages of 8 and 10.

Regardless of who programs the storage device, it may contain instructional data so that when the storage device is used in conjunction with the parental control IC 1002, parents can regulate content, total viewing time, and time-of-day viewing for various entertainment applications and even keep track of a child's use of the computer system. To control content, the external storage device 1012 may be programmed such that when used in conjunction with the parental control IC 1002, the parental control system 1000 will not allow certain files to be viewed or listened to that have an unacceptable rating for the particular child despite user instructions to the contrary.

For instance, the external storage device 1012 may be programmed to specify that only movies having a PG or G rating should be viewable. Similarly, the external storage device 1012 may be programmed to specify that playing of any TV shows rated for adult content or playing any audio files rated for adult content should not be permitted by the computer system. In operation, a child would insert their associated storage device 1012 into the appropriate slot in the computer system. If the child is operating the computer system in the entertainment mode, the instructional data from the external storage device 1012 indicating the appropriate ratings for the various entertainment options would be provided as a first coded signal to the parental control IC 1002. The storage device interface 1004 would then provide a coded input signal to the engine 1010 representative of the first coded signal.

In this instance, the engine 1010 would act as a decryption engine to convert the input coded signal into an output decoded signal. The host interface 1006 accepts the output decoded signal from the engine 1010 and provides a second decoded signal to the host system, e.g., the mini-OS 80 when operating in the entertainment mode, which is readable by the host system. Based on the second decoded signal which is representative of the instructional data on the external storage device 1012, the mini-OS 80 would control the various entertainment options. For instance, the mini-OS 80 would not play an R-rated movie despite a child's command via the function keys or the remote controller to play such a movie if the second decoded signal indicates the instructional data on the external storage device 1012 prohibits the playing of such movies.

In addition to be controlling content, the parental control system 1000 may include the external storage device 1012 programmed to limit access time to entertainment options to a defined time limit during a predetermined time interval. For instance, the external storage device 1012 may be programmed to limit entertainment applications to two hours per day. As the child inserts their associated storage device 1012 into the appropriate slot of the computer system, the parental control IC 1002 communicates instructions to the appropriate OS about the time limit data on the external storage device 1012. As such, the appropriate OS notes the start time of such entertainment application activity by comparison to its internal clock and may then start an internal count. This may be accomplished any variety of ways known in the art including the use of a PLL (phase locked logic) timer that is clocked by a set crystal. Once the internal count reaches the predetermined limit, the appropriate OS shuts down all entertainment applications for that particular child. As such, the parental control system 1000 allows a parent to limit the amount of time a child (including different time intervals for different children) has access to various entertainment applications.

Furthermore, the parental control system 1000 may include the external storage device 1012 programmed to limit access to entertainment options based on the time-of-day. For instance, the external storage device 1012 may be programmed to not permit access to entertainment applications during certain hours, e.g., between 9:00 p.m. and 7:00 a.m. Again, such data is communicated to the appropriate OS via the parental control IC 1002. By comparison to the computer system's own internal clock, the appropriate OS can detect if a particular child is attempting to access entertainment applications during the prohibited times and take appropriate action.

In addition to prohibiting access to certain entertainment applications based on content, time limits, or time-of-day prohibitions, the parental control system 1000 including the parental control IC 1002 can be utilized to track a particular child's use of entertainment applications. For instance, records of which videos were played or which audio files were played may be automatically stored in a specified storage area such as the external storage device 1012 or the hard disk drive of the computer system to name a couple. If Internet access is also available, such techniques can be utilized to create records indicating which web sites have been accessed.

As described above, the entertainment applications can include audio playback applications. The audio playback applications can be implemented by, but not limited to, the mini-OS 80 and IC 40 (i.e., the special purpose circuit 40) solution, the mini-OS 80 only solution, or a filter and isolation circuit solution, which will be described in detail below.

Figure 11:
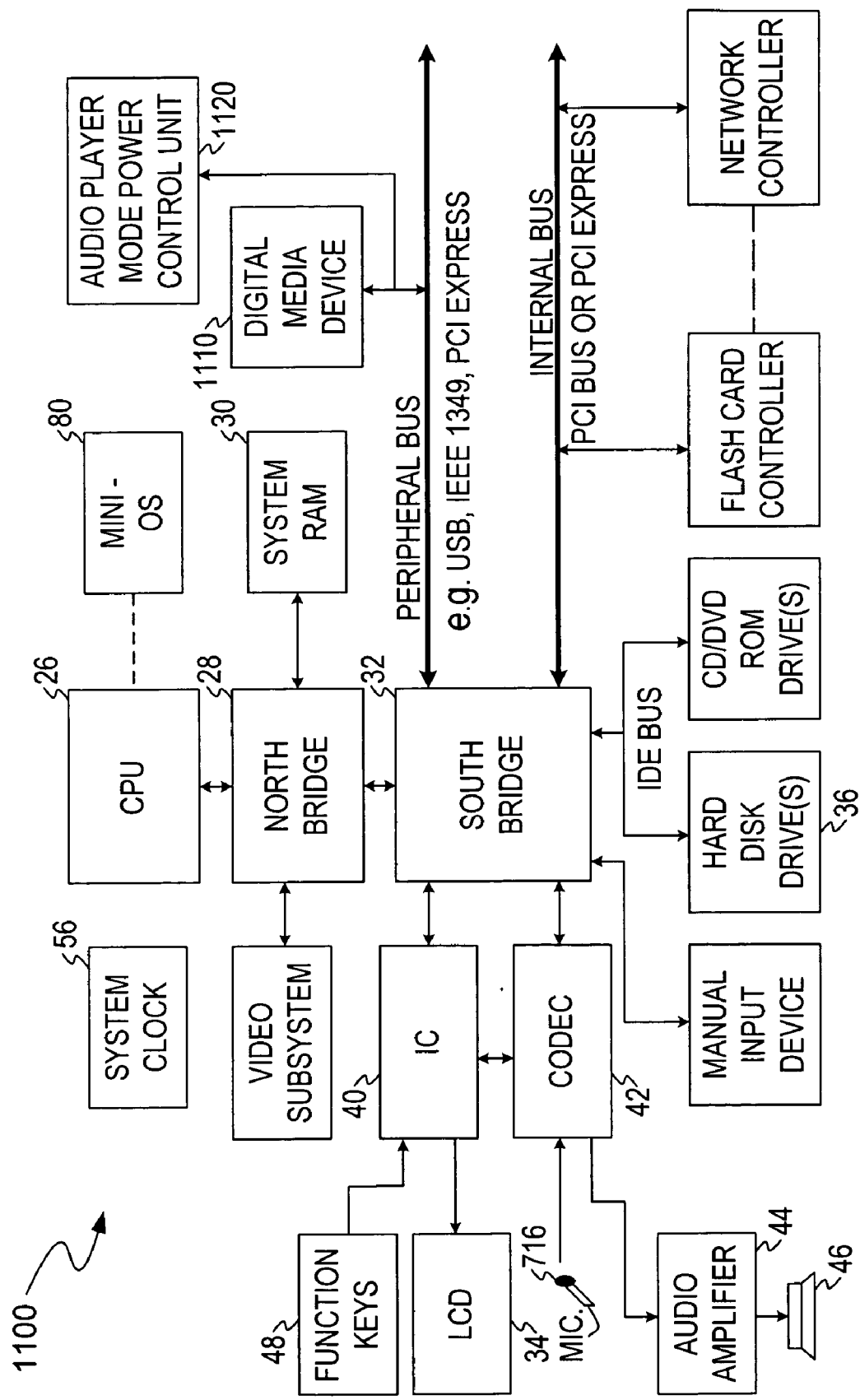
FIG. 11 is a block diagram of an exemplary computer system consistent with yet another embodiment of the present invention.

Turning to FIG. 11, a block diagram of an exemplary computer system 1100 is illustrated. The computer system 1100 also requires appropriate software to play audio files in an audio playback mode. When the computer system 1100 operates in the audio playback mode, the computer system 1100 can load the mini-OS 80 instead of the full operating system (i.e., the normal operating system), e.g., Windows® (the full operating system is not opened) into the system memory (i.e., the system RAM 30). The computer system 1100 operating in the audio playback mode may enable the user to have access to the audio playback applications by utilizing the mini-OS 80 and IC 40 solution. In this exemplary embodiment, the computer system 1100 includes many components described earlier with respect to FIGS. 3, 5, 6, and 7 where similar components are similarly labeled, and hence any repetitive description of those components is omitted herein for clarity. The computer system 1100 includes the IC 40 serving as a keyboard controller adapted to interface with the function keys 48, the ICD 34, the CODEC 42, and the South Bridge 32. The computer system 1100 also includes an interface unit, for example the South Bridge 32, and some peripheral components interfacing with an external digital media device 1110 that can be used to store a plurality of multimedia data including the compressed audio files in various formats. The digital media device 1110 can be an ipod, a MP3 player or any other solid state memory audio player known in the art. An audio player mode power control unit 1120 is used to determine whether the digital media device 1110 is in communication with the computer system 1100. Although the power control unit 1120 is an internal component of the computer system 1100 as illustrated in FIG. 11, it can also be integrated into the IC 40. As an alternative embodiment, the power control unit 1120 can also be replaced by a manual switch. The communication (or the connection) between the digital media device 1110 and the computer system 1100 can be implemented through, but not limited to, a plugged-in connector and/or a wireless interface, which will be described below.

In FIG. 11, the computer system 1100 employs the plugged-in connector. In this embodiment, when the computer system 1100 is powered off, the power control unit 1120 can detect whether the digital media device 1110 is being plugged into the computer system 1100 through a peripheral bus. Such peripheral bus can be USB, IEEE 1394, PCI express, or any other available bus known in the art. The digital media device 1110 may be equipped with the connector to route electrical signals to the peripheral bus. The computer system 1100 may also utilize a regular peripheral connector such as USB with the corresponding cable to connect the digital media device 1110 directly to the peripheral bus. When the digital media device 1110 is plugged into the connector of the computer system 1100, an electrical signal may be generated by the digital media device 1110 and then sent to the power control unit 1120. The power control unit 1120 may sense the electrical signal from the digital media device 1110 and consequently detect that the digital media device 1110 is connected to the peripheral bus.

Alternatively, a mechanical switch (not shown) can also be provided to detect whether the digital media device 1110 is plugged into the computer system 1100 as mentioned above. The mechanical switch can be of any type and shape which depends on the form factors of the computer. If the digital media device 1110 is not plugged into the computer system 1100 while it is powered down, the switch can be set in an OFF state. If the digital media device 1110 is plugged into the computer system 1100, the mechanical switch can be set in an ON state. In this ON state, the switch may produce the electrical signal representative of the digital media device 1110 being plugged in and send the electrical signal to the power control unit 1120. The power control unit 1120 may turn on the power of the computer system 1100 to invoke the audio playback mode.

For the wireless interface (not shown), the connection between the computer system 1100 and the digital media device 1110 can be implemented by any known type of wireless technologies such as infrared or radio frequency (RF). Similar to the plugged-in connector, the wireless interface of computer system 1100 generates an electrical signal to the power control unit 1120 which may turn on the power of the computer system 1100 so as to invoke the audio playback mode.

For more simplicity of description, only connection through the plugged-in connector will be described in detail below. When the power control unit 1120 detects the digital media device 1110 is plugged into the computer system 1100, the power control unit 1120 can automatically turn on the power of the computer system 1100. The computer system 1100 can load the mini-OS 80, and consequently the computer system 1100 is initiated to operate in the audio playback mode. As earlier described, the mini-OS 80 could be implemented as part of the larger OS, e.g., the mini-OS 80 could consist of those portions of the larger OS necessary for operation of audio playback applications.

In the audio player mode, the CPU 26 is capable of transmitting the compressed audio files from the digital media device 1110 into the system RAM 30 under control of the mini-OS 80. The CPU 26 then can perform the audio decoding, in other words, the CPU 26 can decode the compressed audio files received from the digital media device 1110. The decoded audio data can be further transmitted to the CODEC 42. After being converted from digital into analog by the CODEC 42, the audio data will be further amplified by the amplifier 44, and then the amplified audio data is played by the speaker 46 or headset (not shown). When playing the audio files, the appropriate software can perform the power saving function described above to minimize the power usage.

As an alternative, the digital media device 1110 can also directly decode the compressed audio files, and then send the decoded audio data such as the pulse code modulation (PCM) audio data to the computer system 1100 through the peripheral bus as shown. The decoded audio data then will be stored in the system RAM 30. The decoded audio data can be played by the speaker 46 or headset (not shown) after the conversion from digital into analog and amplification.

The digital media device 1110 has its own keypad to allow the user to execute various functions and applications. For example, the function keys or any combination of these function keys on the keypad can be utilized to control the audio playback such as play, fast forward, rewind, pause, scan, previous track, next track, and volume control. Selection of the playlist or songs can also be executed through activating associated function keys on the keypad of the digital media device 1110. Regardless of the audio playback or other operations, the digital media device 1110 is adapted to send out corresponding commands to the computer system 1100. The mini-OS 80 is capable of receiving the commands from the digital media device 1110 whether the connection between the digital media device 1110 and the computer system 1100 utilizes the plugged-in connector or the wireless interface. A special software driver is also required to perform those functions previously described so as to control various features of the audio player software and enable those elements of the computer system 1100 to play the selected audio files. The digital media device 1110 also has a built-in display unit (not shown) to display the information based upon the above functions and applications.

Alternatively, while the computer system 1100 is operating in the audio player mode under control of the mini-OS 80, the function keys 48 can also be provided to replace the keypad of the digital media device 1110 and allow the user to control several operations of the computer system 1100. The function keys 48 coupled to the IC 40 can be used to search the playlist or songs in the digital media device 1110. The function keys 48 can also be employed to control the audio playback such as play, fast forward, rewind, pause, and volume control. The ICD 34 is also coupled to the IC 40 and may be utilized to display appropriate information according to the functions and applications selected by the user and enable the user to monitor the above information simultaneously.

Although there are two buses, such as the peripheral bus and the internal bus to perform the communication as shown in FIG. 11, a combined bus can also replace these two buses for communication with the elements that are coupled to these buses.

Figure 12:
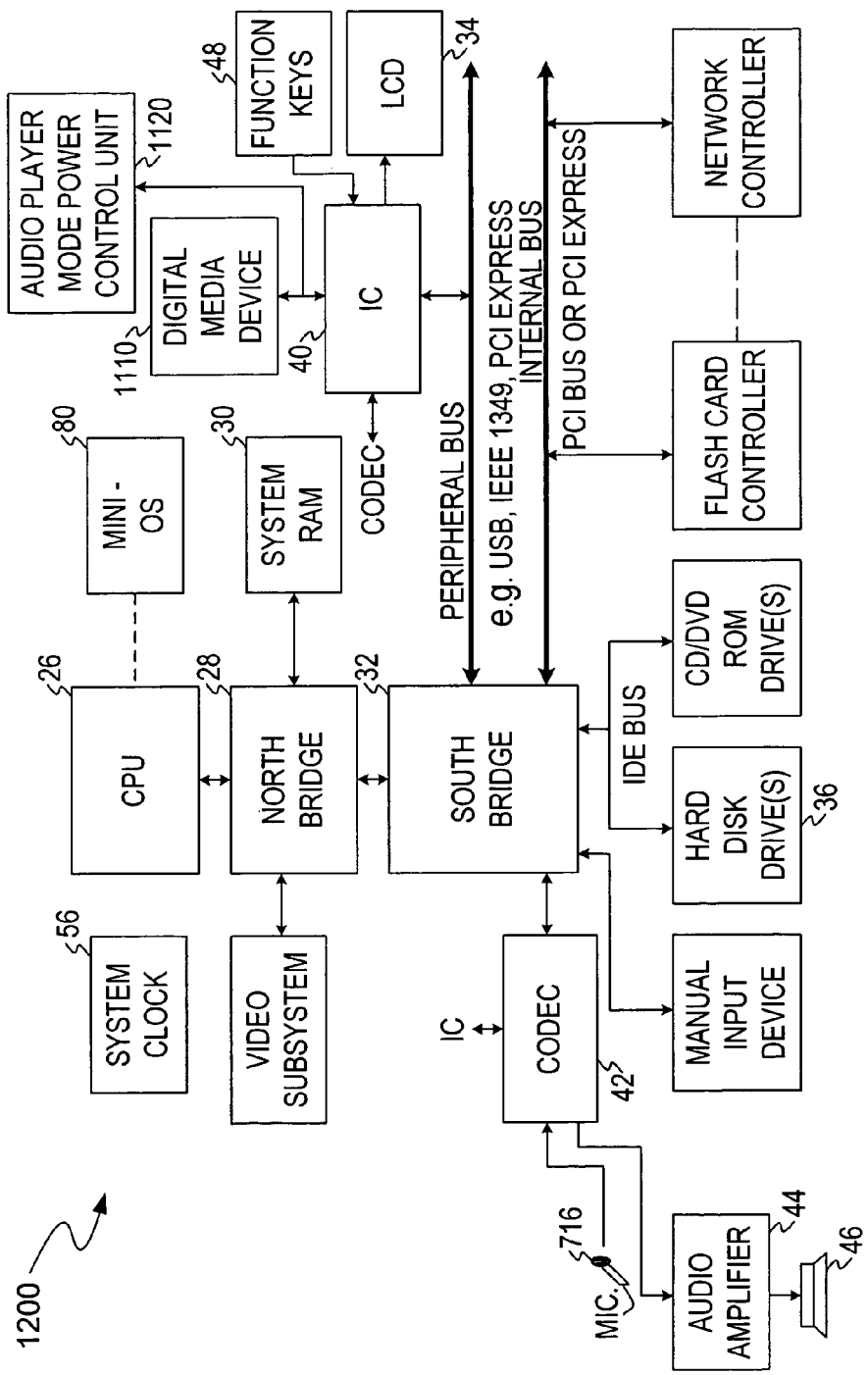
FIG. 12 is a block diagram of an exemplary computer system consistent with yet another embodiment of the present invention.

FIG. 12 illustrates a block diagram of another exemplary computer system 1200. For the computer system 1200, the audio playback applications may also be implemented with the mini-OS 80 and IC 40 solution. Since the symbols in FIG. 12 are similar to those in FIG. 11, the similar functions and repetitive description of these same components will be omitted herein. Only the difference will be further described in details herein. The IC 40, instead of being connected to the South Bridge 32, is now connected to the peripheral bus to interface with the South Bridge 32. The IC 40 is also equipped with a dedicated bus to be connected to the digital media device 1110. The dedicated bus can be any kind of available buses known in the art, such as USB, IEEE 1394, or PCI Express. In this embodiment, the IC 40 may act as a hub of the computer system 1200 for interfacing with the elements that are coupled to it as shown in FIG. 12. When the keypad of the digital media device 1110 is used to execute various functions and applications, the IC 40 can receive the compressed audio files, the decoded audio data or the electrical signals from the digital media device 1110 and transmit the above information to the computer system 1200 through the dedicated bus and the peripheral bus.

Figure 13:
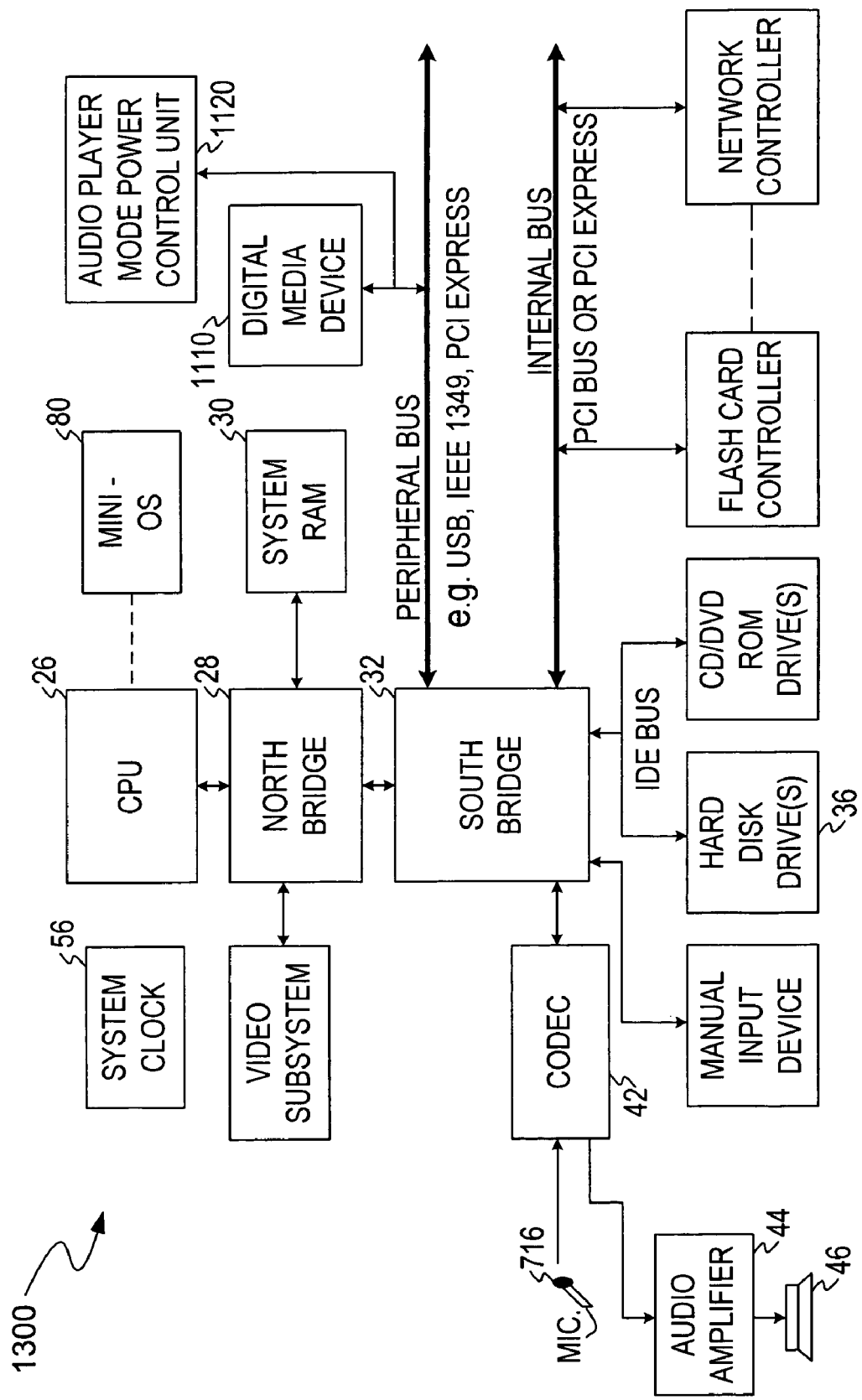
FIG. 13 is a block diagram of an exemplary computer system consistent with yet another embodiment of the present invention.

FIG. 13 is a block diagram of an exemplary computer system 1300 implemented with the mini-OS 80 solution. Compared with the computer systems 1100 and 1200, the computer system 1300 has audio playing control without the IC 40, the function keys 48 and the ICD 34 from FIGS. 11 and 12. In this embodiment, only the keypad on the digital media device 1110 may be used to enable the user to execute the previous functions and applications, such as the audio playback and the selection of the playlist or songs. In addition, only the display unit (not shown) of the digital media device 1110 is used to show the information based on the above functions and applications.

Figure 14:
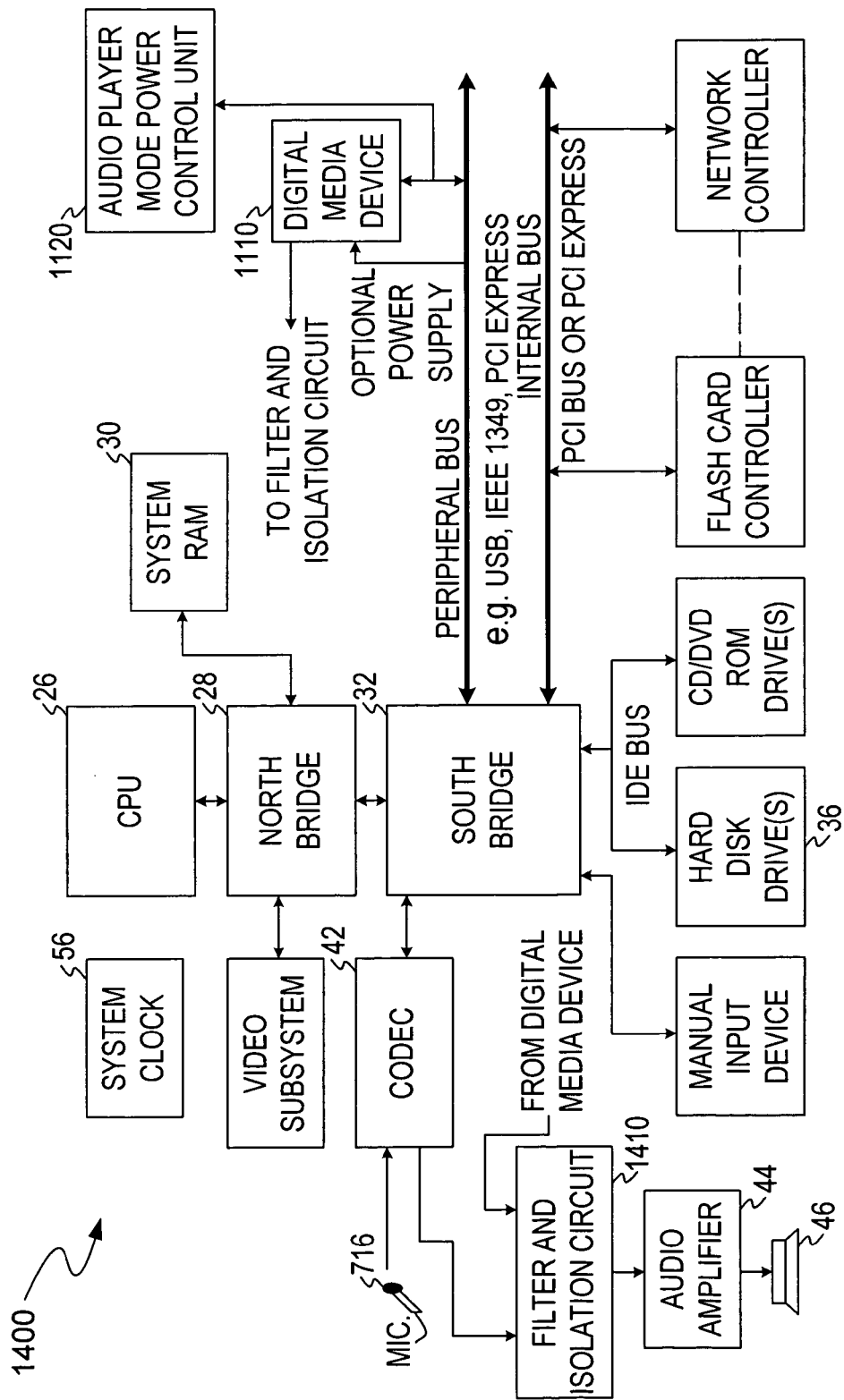
FIG. 14 is a block diagram of an exemplary computer system consistent with yet another embodiment of the present invention.

FIG. 14 is a block diagram of an exemplary computer system 1400 that can be implemented with the filter and isolation circuit solution. A built-in battery of the digital media device 1110 with limited energy conventionally is used to supply power in the process of playing the audio files. However, in this embodiment, an optional power supply from the battery of the computer system 1400 can be also used to provide power to the digital media device 1110 through the peripheral bus. As a result, the playing time for the compressed audio files can be greatly increased. The digital media device 1110 can decode the compressed audio files by itself and produce analog audio outputs according to the decoded audio data. The computer system 1400 includes a filter and isolation circuit 1410 that allows the analog audio outputs to be received from the digital media device 1110 while the normal operating system (the full operating system) and the mini-OS 80 are both off. In this condition, the CODEC 42 is also power off during the audio playback mode. After a leakage current in the analog audio outputs is eliminated by the filter and isolation circuit 1410, the analog audio outputs will then be amplified by the audio amplifier 44 (the amplifier 44), and the amplified analog audio outputs will be played by the speaker 46 or headset (not shown).

Figure 15:
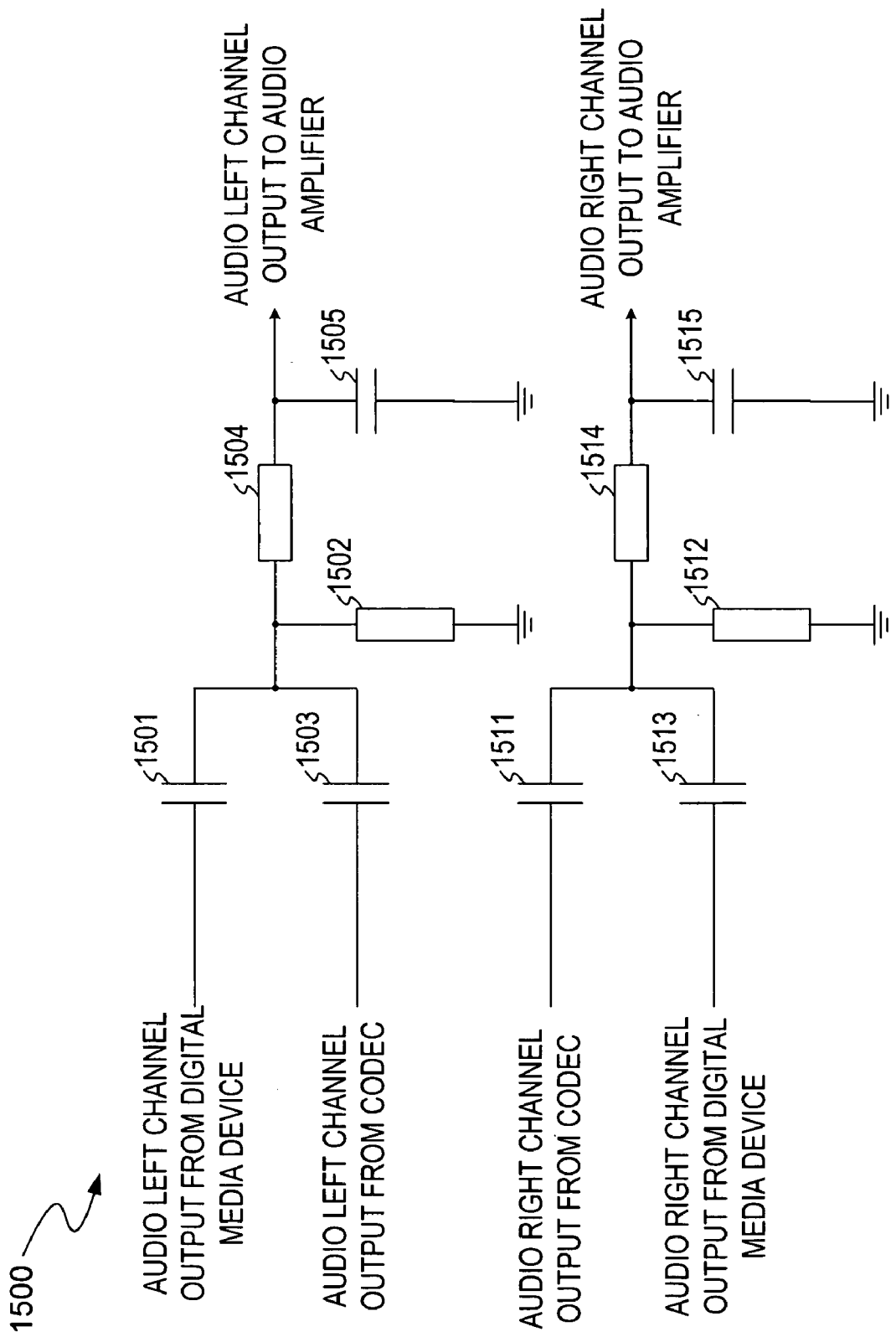
FIG. 15 is a schematic diagram of the filter and isolation circuit in FIG. 14.

FIG. 15 is a schematic diagram of the filter and isolation circuit 1410 in FIG. 14. In this embodiment 1500, two channels, a left channel and a right channel are provided to process the analog audio outputs from the digital media device 1110. The left channel consists of, but not limited to, three capacitors 1501, 1503, and 1505, and two resistors 1502 and 1504. The capacitor 1501 and the resistor 1502 forms a high-pass filter to filter the analog audio output at the left channel, that is the left channel output, at a desirable higher frequency. A low-pass filter composed of the resistor 1504 and the capacitor 1505 can further filter the left channel output at a desirable lower frequency. After being filtered, the noises in the audio left channel output are greatly reduced and the audio left channel output then will be delivered to the audio amplifier 44. Since the normal operating system and the mini-OS 80 are off, no audio left channel output is delivered from the CODEC 42. Similarly, the right channel output from the digital media device 1110 is filtered at another desirable higher frequency and lower frequency, and then transmitted to the audio amplifier 44 for further amplification, and no audio right channel output is delivered from the CODEC 42. In addition, when the digital media device 1110 is powered up and the computer system 1400 is powered down, the capacitor 1503 can prevent the audio left channel output from flowing into the CODEC 42, and the capacitor 1513 can also preclude the audio right channel output from entering into the CODEC 42. Therefore, the filter and isolation circuit 1410 is advantageous to block the audio signals from flowing back to the CODEC 42 in the computer system 1400.

Figure 16:
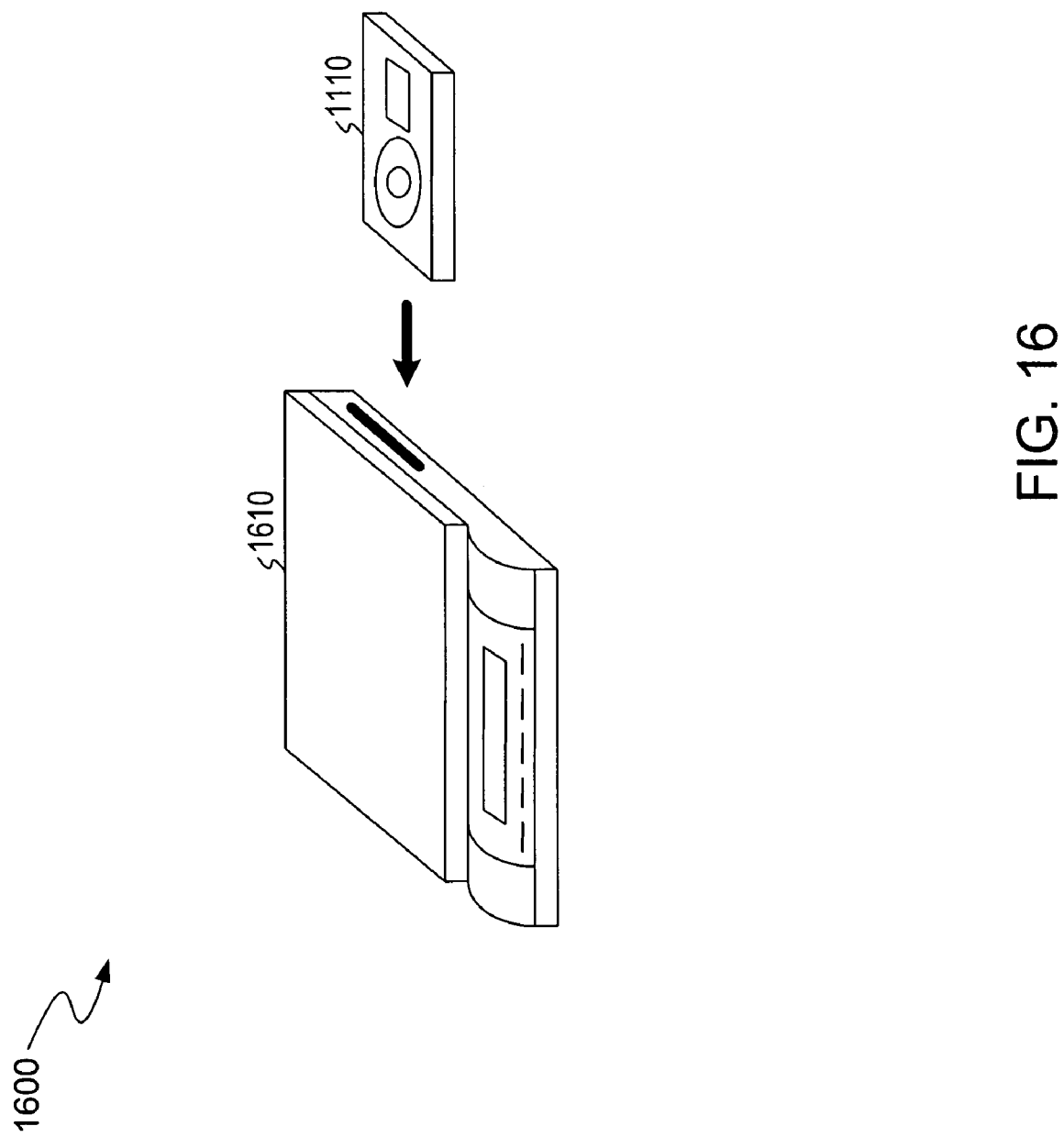
FIG. 16 is a simplified diagram of a computer system serving as an audio player system.

FIG. 16 is a simplified diagram of a computer system 1600 serving as an audio player system. Although a notebook 1610 is shown in FIG. 16 for illustration, those skilled in the art will appreciate that any other computer system known in the art can be also employed to act as the audio player system. The external digital media device 1110 can be plugged into the notebook 1610 to play the compressed audio files or other non-compressed data through various above-mentioned methods and techniques. Additionally, the wireless interface technique can also be used to transmit the information including the electrical signals, the compressed audio files, or the decoded audio data between the digital media device 1110 and the notebook 1610. The digital media device 1110 can be any conventional and/or custom solid state memory audio player.

Although the present invention has been described in terms of the exemplary embodiments provided herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A computer system adapted to play audio files, comprising:
    a central processing unit (CPU);
    a first operating system, said first operating system being run by the computer system in a first operation mode;
    an interface unit adapted to interface with an external digital media device capable of storing a plurality of compressed audio files; and
    a second operating system capable of transmitting the plurality of compressed audio files from the external digital media device into the storage unit, the second operating system being run by the computer system operating in an audio playback mode,
    wherein the CPU loads one of the first operating system and the second operating system responsive to a control signal, wherein the plurality of compressed audio files are transferred from a south bridge of the computer system through a first transfer path to an output amplifier if the first operating system is running in the first operation mode, and wherein the plurality of compressed audio files are transferred from the south bridge through a second transfer path to the output amplifier if the second operating system is running in the audio playback mode when the external digital media device is in communication with the interface unit, and
    wherein the audio playback mode receives commands from a plurality of function keys through the second transfer path when the second operating system is running in the audio playback mode.

2. The computer system of claim 1, further comprising a power control unit for determining whether the external digital media device is connected to the computer system.

3. The computer system of claim 1, wherein the communication between the external digital media device and the computer system is through a wireless interface.

4. The computer system of claim 1, wherein the communication between the external digital media device and the computer system is through a connector.

5. The computer system of claim 1, wherein the CPU is configured to decode the plurality of compressed audio files.

6. The computer system of claim 1, wherein the external digital media device is configured to decode the plurality of compressed audio files.

7. The computer system of claim 6, wherein the second operating system is capable of transmitting the decoded audio files from the external digital media device to the storage unit.

8. The computer system of claim 1, further comprising a speaker unit capable of playing the plurality of compressed audio files after the plurality of the compressed audio files is decoded.

9. A computer system adapted to play audio files, comprising:
- a central processing unit (CPU);
- a storage unit;
- a first operating system, said first operating system being run by the computer system in a first operation mode;
- an interface unit adapted to interface with an external digital media device capable of storing a plurality of compressed audio files;
- a switch adapted to determine whether the external digital media device is interfacing with the interface unit; and
- a second operating system capable of transmitting the plurality of compressed audio files from the external digital media device into the storage unit, the second operating system being run by the computer system operating in an audio playback mode,
- wherein the CPU loads one of the first operating system and the second operating system responsive to a control signal, wherein the plurality of compressed audio files are transferred from a south bridge of the computer system through a first transfer path to an output amplifier if the first operating system is running in the first operation mode, and wherein the plurality of compressed audio files are transferred from the south bridge through a second transfer path to the output amplifier if the second operating system is running in the audio playback mode when the switch determined that the external digital media device is in communication with the interface unit, and
- wherein the audio playback mode receives commands from a plurality of function keys through the second transfer path when the second operating system is running in the audio playback mode.

10. The computer system of claim 9, wherein the communication between the external digital media device and the computer system is through a wireless interface.

11. The computer system of claim 9, wherein the communication between the external digital media device and the computer system is through a connector.

12. The computer system of claim 9, wherein the CPU is configured to decode the plurality of compressed audio files.

13. The computer system of claim 9, wherein the external digital media device is configured to decode the plurality of compressed audio files.

14. The computer system of claim 13, wherein the second operating system is capable of transmitting the decoded audio files from the external digital media device to the storage unit.

15. The computer system of claim 9, further comprising a speaker unit capable of playing the plurality of compressed audio files after the plurality of the compressed audio files is decoded.

16. A method for playing a plurality of compressed audio files stored in an external digital media by a computer system, comprising the steps of:
- detecting the external digital media device being in communication with an interface unit in the computer system;
- loading one of a first operating system and a second operating system responsive to a control signal;
- transmitting the plurality of compressed audio files from the external digital media device to a storage unit in the computer system;
- decoding the plurality of compressed audio files;
- transferring the decoded audio files from a south bridge of the computer system through a first transfer path to an output amplifier if the first operating system is running in a first operation mode;
- transferring the decoded audio files from from the south bridge through a second transfer path to the output amplifier if the second operating system is running in the audio playback mode; and
- receiving commands from a plurality of function keys through the second transfer path when the second operating system is running in the audio playback mode.

17. The method of claim 16, further comprising the step of decoding the plurality of compressed audio files at the digital media device.

18. The method of claim 16, further comprising the step of decoding the plurality of compressed audio files at a central processing unit (CPU) of the computer system.

* * * * *